US012645180B2

(12) United States Patent
Iriyama et al.

(10) Patent No.: US 12,645,180 B2
(45) Date of Patent: Jun. 2, 2026

(54) IMAGE FORMING SYSTEM AND IMAGE FORMING APPARATUS

(71) Applicant: BROTHER KOGYO KABUSHIKI KAISHA, Nagoya (JP)

(72) Inventors: Shota Iriyama, Toyokawa (JP); Tokifumi Tanaka, Komaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/941,822

(22) Filed: Nov. 8, 2024

(65) Prior Publication Data

US 2025/0164921 A1 May 22, 2025

(30) Foreign Application Priority Data

Nov. 16, 2023 (JP) ................................ 2023-195405

(51) Int. Cl.
*G03G 15/20* (2006.01)
*G03G 21/16* (2006.01)

(52) U.S. Cl.
CPC ..... *G03G 21/1647* (2013.01); *G03G 15/2021* (2013.01); *G03G 21/1633* (2013.01); *G03G 21/1685* (2013.01); *G03G 2215/2006* (2013.01); *G03G 2221/1639* (2013.01); *G03G 2221/1654* (2013.01)

(58) Field of Classification Search
CPC ........... G03G 15/2017; G03G 15/2021; G03G 21/1633; G03G 21/1647; G03G 21/1652; G03G 21/1685; G03G 2215/2006; G03G 2221/1654
See application file for complete search history.

(56) References Cited

U.S. PATENT DOCUMENTS

| | | | | |
|---|---|---|---|---|
| 2007/0189781 A1 | 8/2007 | Katogi et al. | |
| 2024/0264556 A1* | 8/2024 | Iriyama | G03G 21/1685 |
| 2024/0310773 A1* | 9/2024 | Iriyama | G03G 21/1685 |
| 2024/0310776 A1* | 9/2024 | Okamoto | G03G 21/1647 |
| 2025/0060692 A1* | 2/2025 | Osuka | G03G 15/2017 |

FOREIGN PATENT DOCUMENTS

| | | |
|---|---|---|
| JP | 2001-75420 A | 3/2001 |
| JP | 2003-345147 A | 12/2003 |
| JP | 2007-218975 A | 8/2007 |
| JP | 2022-071715 A | 5/2022 |

* cited by examiner

*Primary Examiner* — Sophia S Chen
(74) *Attorney, Agent, or Firm* — Merchant & Gould P.C.

(57) ABSTRACT

An image forming system includes a first image forming apparatus and a second image forming apparatus. The first image forming apparatus includes a first housing having a first guide and a first housing contact portion, and a first fixing unit having a first unit contact portion. The second image forming apparatus includes a second housing having a second guide and a second housing contact portion, and a second fixing unit having a second unit contact portion. The first unit contact portion contacts the second housing contact portion during the process the first fixing unit is guided by the second guide and interferes with installation of the first fixing unit into the second housing. The second unit contact portion contacts the first housing contact portion during the process the second fixing unit is guided by the first guide and interferes with installation of the second fixing unit into the first housing.

11 Claims, 16 Drawing Sheets

IMAGE FORMING SYSTEM AND IMAGE FORMING APPARATUS

REFERENCE TO RELATED APPLICATIONS

This application claims priority from Japanese Patent Application No. 2023-195405 filed on Nov. 16, 2023. The entire contents of the priority application are incorporated herein by reference.

BACKGROUND ART

An image forming apparatus known in the art including a fixing unit installable into and removable from a main housing includes a controller for restraining a fixing unit having a different specification being installed by mistake. In such art, in a state where a fixing unit having a first specification is installed into a main housing having a first specification, an input port of a controller contacts the ground through a jumper harness provided on the fixing unit and assumes a low level. The controller thereby determines that the fixing unit having a matching specification has been installed. In a state where a fixing unit having a second specification is installed into the main housing having the first specification, the input port of the controller does not contact the ground through the jumper-harness provided on the fixing unit and assumes a high level. The controller thereby determines that the fixing unit having a matching specification is not installed.

SUMMARY

In the image forming apparatus known in the art, since incorrect installation is detected by the state of the energization of the input port, the image forming apparatus (controller) must be operated to detect incorrect installation.

Thus, it is desirable to provide an image forming system and an image forming apparatus capable of detecting incorrect installation of the fixing unit without operating the image forming apparatus.

An image forming system according to the present disclosure comprises a first image forming apparatus and a second image forming apparatus.

The first image forming apparatus comprises a first housing and a first fixing unit installable into and removable from the first housing.

The second image forming apparatus comprises a second housing and a second fixing unit installable into and removable from the second housing.

The first housing comprises a first guide and a first housing contact portion.

The first guide is configured to guide the first fixing unit in a predetermined direction and to guide the second fixing unit in the predetermined direction.

The second housing comprises a second guide and a second housing contact portion.

The second guide is configured to guide the first fixing unit in the predetermined direction and to guide the second fixing unit in the predetermined direction.

The first fixing unit comprises a first unit contact portion.

The first unit contact portion interferes with installation of the first fixing unit into the second housing. The first unit contact portion is configured to contact the second housing contact portion during the process in which the first fixing unit is guided by the second guide.

The second fixing unit comprises a second unit contact portion.

The second unit contact portion interferes with installation of the second fixing unit into the first housing. The second unit contact portion is configured to contact the first housing contact portion during the process in which the second fixing unit is guided by the first guide.

Since the first housing is configured to comprise the first housing contact portion that contacts the second unit contact portion of the second fixing unit, when one attempts to install the second fixing unit into the first housing by mistake, the second unit contact portion contacts the first housing contact portion when the second fixing unit is being guided by the first guide and the second fixing unit is stopped part way, and incorrect installation can be determined without operating the first image forming apparatus. Since the second fixing unit is configured such that the second unit contact portion and the first housing contact portion contact each other in a process where the second fixing unit is guided by the first guide, predetermined portions of the second fixing unit and the first housing contact each other, and a part of the second fixing unit having a low rigidity can be restrained from contacting the first main housing and breaking.

Similarly, since the second housing is configured to comprise the second housing contact portion that contacts the first unit contact portion in a process where the first fixing unit is guided by the second guide, incorrect installation of the first fixing unit to the second housing can be determined without operation of the second image forming apparatus and breaking of the first fixing unit, etc., can restrained.

Each of the first unit contact portion and the second unit contact portion may be a protrusion protruding in a direction non-parallel to the predetermined direction.

The first unit contact portion may be positioned upstream of a downstream end of the first fixing unit in a direction in which the first fixing unit is installed. The second unit contact portion may be positioned upstream of a downstream end of the second fixing unit in a direction in which the second fixing unit is installed.

Since the first unit contact portion is positioned upstream of the downstream end of the first fixing unit in the direction in which the first fixing unit is installed, the user can easily check the first unit contact portion that is in contact with the second housing contact portion when the first unit contact portion contacts the second housing contact portion, and the user can thereby immediately understand that the first fixing unit is incorrectly installed. Similarly, since the second unit contact portion is positioned upstream of the downstream end of the second fixing unit in the direction in which the second fixing unit is installed, the user can immediately understand that the second fixing unit is incorrectly installed in the first housing.

The first unit contact portion may be positioned at a position different from a position of the first housing contact portion in a longitudinal direction of the first fixing unit in a state where the first fixing unit is installed in the first housing. The second unit contact portion may be positioned at a position different from a position of the second contact portion in a longitudinal direction of the second fixing unit in a state where the second fixing unit is installed in the second housing.

The first fixing unit may comprise a first heating member configured to heat a sheet and the second fixing unit may comprise a second heating member configured to heat a sheet. The first unit contact portion is positioned within a range of the first heating member in a width direction of the sheet, and the second unit contact portion is positioned within a range of the second heating member in the width direction of the sheet.

The first fixing unit may comprise a first outer cover made of plastic that forms an outer surface of the first fixing unit. The second fixing unit may comprise a second outer cover made of plastic that forms an outer surface of the second fixing unit.

The first unit contact portion is formed integrally with the first outer cover and the second unit contact portion is formed integrally with the second outer cover.

A plurality of the first housing contact portions may be provided on a first member elongated in a longitudinal direction of the first fixing unit. A plurality of the second housing contact portions may be provided on a second member elongated in a longitudinal direction of the second fixing unit.

The first fixing unit may comprise a plurality of the first unit contact portions, each of the first unit contact portions being positioned at a position corresponding to each of the second housing contact portions. The second fixing unit may comprise a plurality of the second unit contact portions, each of the second unit contact portions being positioned at a position corresponding to each of the first housing contact portions.

Since the first fixing unit comprises the first unit contact portions, each of the first unit contact portions being positioned at a position corresponding to each of the second housing contact portions, each of the plurality of first unit contact portions contacts the corresponding second housing contact portion, and the first fixing unit can be restrained from tilting and becoming hard to remove from the second housing. Similarly, since the second fixing unit comprises the second unit contact portions, each of the second unit contact portions being positioned at a position corresponding to each of the first housing contact portions, the second fixing unit can be restrained form tilting and becoming hard to remove.

At least one first unit contact portion may be provided on one side of a central portion of the first fixing unit in the longitudinal direction and at least one first unit contact portion may be provided on another side of the central portion of the first fixing unit in the longitudinal direction. At least one second unit contact portion may be provided on one side of a central portion of the second fixing unit in the longitudinal direction and at least one second unit contact portion may be provided on another side of the central portion of the second fixing unit in the longitudinal direction.

Since at least one first unit contact portion is provided on one side of the central portion of the first fixing unit in the longitudinal direction and at least one first unit contact portion is provided on another side of the central portion of the first fixing unit in the longitudinal direction, the first fixing unit can be further restrained from tilting and becoming hard to remove. Similarly, since at least one second unit contact portion is provided on one side of the central portion of the second fixing unit in the longitudinal direction and at least one second unit contact portion is provided on another side of the central portion of the second fixing unit in the longitudinal direction, the second fixing unit can be further restrained from tilting and becoming hard to remove.

Each of the first member and the second member may have a conveyance rib configured to guide the sheet.

The first housing may comprise a first housing connector, the second housing may comprise a second housing connector, the first fixing unit may comprise a first unit connector connectable to the first housing connector, and the second fixing unit may comprise a second unit connector connectable to the second housing connector.

The first housing connector may have a first housing interference portion and the second housing connector may have a second housing interference portion.

The first unit connector may comprise a first unit interference portion. The first unit interference portion interferes with connection of the first unit connector to the second housing connector. The first unit interference portion is configured to contact the second housing interference portion during the process in which the first fixing unit is guided by the second guide.

The second unit connector may comprise a second unit interference portion. The second unit interference portion interferes with connection of the second unit connector to the first housing connector. The second unit interference portion is configured to contact the first housing interference portion during the process in which the second fixing unit is guided by the first guide.

Since the first unit connector comprises the first unit interference portion configured to contact the second housing interference portion of the second housing connector, the first unit connector can be restrained from being connected to the second unit connector by mistake by the first unit interference portion contacting the second housing interference portion. Similarly, since the second unit connector comprises the second unit interference portion configured to contact the first housing interference portion of the first housing connector, the second unit connector can be restrained from being connected to the first unit connector by mistake.

The first housing may comprise a first interlock switch. The first interlock switch is configured to allow power to be supplied from the first housing connector to the first unit connector in an on-state. The first interlock switch is configured to shut off power from the first housing connector to the first unit connector in an off-state.

The second housing may comprise a second interlock switch. The second interlock switch is configured to allow power to be supplied from the second housing connector to the second unit connector in an on-state. The second interlock switch is configured to shut off power from the second housing connector to the second unit connector in an off-state.

The first interlock switch is switched from the off-state to the on-state in a state where the first fixing unit is installed in the first housing.

The second interlock switch is switched from the off-state to the on-state in a state where the second fixing unit is installed in the second housing.

Since the first interlock switch is configured to be switched from the off-state to the on-state in a state where the first fixing unit is installed in the first housing, power supply to the fixing unit is allowed only when the first fixing unit is installed in the first housing. Since the second interlock switch is configured to be switched from the off-state to the on-state in a state where the second fixing unit is installed in the second housing, power supply to the fixing unit is allowed only when the second fixing unit is installed in the second housing.

The first housing may comprise a first interlock switch. The first interlock switch is configured to allow power to be supplied from the first housing connector to the first unit connector in an on-state. The first interlock switch is configured to shut off power from the first housing connector to the first unit connector in an off-state.

The second housing may comprise a second interlock switch. The second interlock switch is configured to allow power to be supplied from the second housing connector to the second unit connector in an on-state. The second interlock switch is configured to shut off power from the second housing connector to the second unit connector in an off-state.

The first interlock switch is switched from the off-state to the on-state in a process where the first fixing unit is installed into the first housing by the first interlock switch being pressed by the first fixing unit. The first interlock switch remains in the off-state from when the second fixing unit is inserted into the first housing until when the second unit contact portion contacts the first housing contact portion by the first interlock switch not being pressed by the second fixing unit.

The second interlock is switched from the off-state to the on-state in a process where the second fixing unit is installed into the second housing by the second interlock switch being pressed by the second fixing unit. The second interlock switch remains in the off-state from when the first fixing unit is inserted into the second housing until when the first unit contact portion contacts the second housing contact portion by the second interlock switch not being pressed by the first fixing unit.

Since the first interlock switch is configured to remain in the off-state from when the second fixing unit is inserted into the first housing until when the second unit contact portion contacts the first housing contact portion, the first interlock switch can be restrained from being switched to the on-state and supplying power from the first housing connector to the second unit connector by mistake when the second fixing unit is inserted into the first housing. Similarly, since the second interlock switch is configured to remain in the off-state from when the first fixing unit is inserted into the second housing until when the first unit contact portion contacts the second housing contact portion, supplying power from the second housing connector to the first unit connector by mistake can be restrained.

An image forming apparatus according to the present disclosure comprises a main housing and a first fixing unit installable into and removable from the main housing.

The main housing comprises a guide and a main housing contact portion.

The guide is configured to guide the first fixing unit and to guide a second fixing unit that has a specification different from a specification of the first fixing unit.

The main housing contact portion interferes with installation of the second fixing unit into the main housing. The main housing contact portion is configured to contact a second unit contact portion of the second fixing unit during the process in which the second fixing unit is guided by the guide.

Since the main housing is configured to comprise the main housing contact portion that contacts the second unit contact portion of the second fixing unit, when one attempts to install the second fixing unit into the main housing by mistake, the second unit contact portion contacts the main housing contact portion when the second fixing unit is being guided by the guide and the second fixing unit is stopped part way, and incorrect installation of the fixing unit is determined without operating the image forming apparatus. Since the second fixing unit is configured such that the second unit contact portion and the main housing contact portion contact each other in a process where the second fixing unit is guided by the guide, predetermined portions of the second fixing unit and the main housing contact each other, and a part of the second fixing unit having a low rigidity can be restrained from contacting the main housing and breaking.

The above aspects, other advantages and further features will become more apparent by describing in detail illustrative, non-limiting embodiments thereof with reference to the accompanying drawings, in which.

DESCRIPTION

Figure 1:
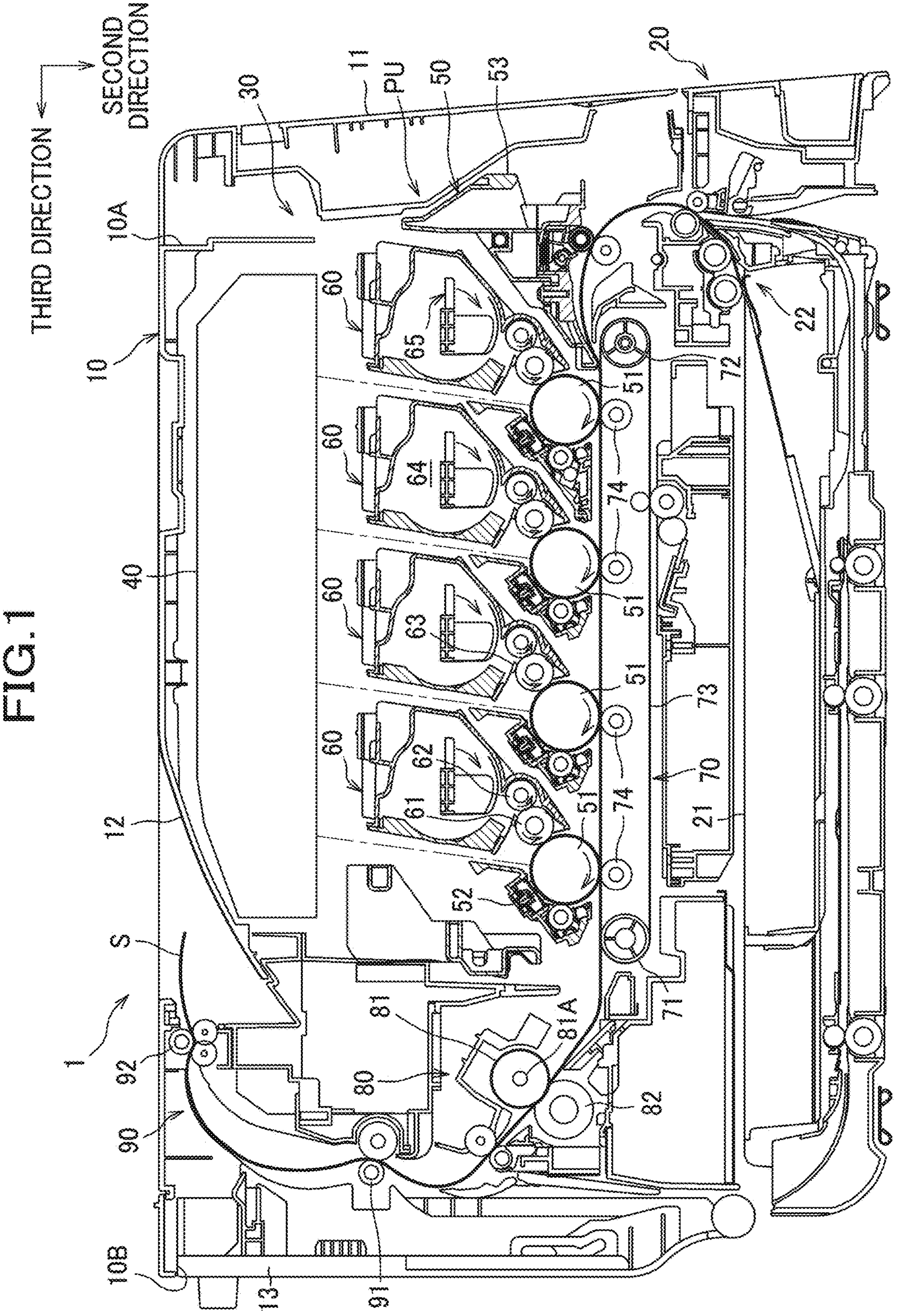
FIG. 1 is a cross-sectional view of an embodiment of an image forming apparatus.

An embodiment of the present disclosure will be described in detail referring to the drawings where appropriate.

As shown in FIG. 1, an image forming apparatus 1 comprises a main housing 10, a sheet feeder unit 20, a process section 30, a fixing unit 80, and a sheet ejection unit 90.

The main housing 10 comprises a front cover 11, an output tray 12, and a rear cover 13. The main housing 10 comprises an opening 10A and an opening 10B. The front cover 11 covers and uncovers the opening 10A formed on the front side of the main housing 10. The rear cover 13 covers and uncovers the opening 10B formed on the rear side of the main housing 10.

The sheet feeder unit 20 comprises a sheet tray 21 and a feeding mechanism 22. The sheet tray 21 contains sheets S such as paper or the like. The feeding mechanism 22 feeds the sheets S in the sheet tray 21 to the process section 30.

The process section 30 forms a toner image on each sheet S. The process section 30 comprises an exposure device 40, a process unit PU, and a transfer unit 70.

The exposure device 40 is located above the process unit PU. The exposure device 40 emits light beams to expose surfaces of photosensitive drums 51.

The process unit PU is located between the sheet tray 21 and the exposure device 40. The process unit PU is installable into and removable from the main housing 10 through the opening 10A of the main housing 10, which is uncovered by opening the front cover 11. The process unit PU comprises a drum cartridge 50 and a plurality of toner cartridges 60.

The drum cartridge 50 comprises a plurality of photosensitive drums 51, a plurality of chargers 52 corresponding to the plurality of photosensitive drums 51, and a drum frame 53.

The drum frame 53 supports the photosensitive drums 51 and the chargers 52. The drum frame 53 is movably supported by the main housing 10. The toner cartridges 60 are installable onto and removable from the drum frame 53.

The plurality of toner cartridges 60 each contains toner of a different color. Each toner cartridge 60 comprises a development roller 61, a supply roller 62, a doctor blade 63, a toner containing unit 64 that contains toner, and an agitator 65.

The agitator 65 agitates toner in the toner containing unit 64. The agitator 65 supplies toner to the supply roller 62. The supply roller 62 supplies toner to the development roller 61. The doctor blade 63 adjusts the thickness of the toner on the development roller 61 to a uniform thickness.

The transfer unit 70 is located between the sheet tray 21 and the process unit PU. The transfer unit 70 comprises a drive roller 71, a follower roller 72, a conveyor belt 73, and a plurality of transfer rollers 74. The conveyor belt 73 is an endless belt configured to convey the sheet S. The drive roller 71 and the follower roller 72 cause the conveyor belt 73 to rotate. The transfer rollers 74 face an inner surface of the conveyor belt 73. The conveyor belt 73 is sandwiched between the transfer rollers 74 and the photosensitive drums 51.

The fixing unit 80 comprises a heating roller 81 as an example of a heating member, and a pressure roller 82. The heating roller 81 includes a heater 81A. The heating roller 81 receives a driving force from a drive source (not shown) and rotates. The heating roller 81 heats the sheet S.

The pressure roller 82 nips the sheet S in combination with the heating roller 81. The pressure roller 82 is driven by the heating roller 81 and rotates.

The chargers 52 charge the respective surfaces of the photosensitive drums 51. The exposure device 40 exposes the surfaces of the photosensitive drums 51. Electrostatic latent images are thereby formed on the photosensitive drums 51. The development rollers 61 supply toner to the respective photosensitive drums 51. Toner images are thereby formed on the photosensitive drums 51.

The sheet feeder unit 20 feeds the sheet S between the photosensitive drums 51 and the transfer rollers 74. The toner images on the photosensitive drums 51 are transferred onto the sheet S. The sheet S on which the toner images are transferred is conveyed between the heating roller 81 and the pressure roller 82. The fixing unit 80 thereby thermally fixes the toner images onto the sheet S.

The sheet ejection unit 90 comprises a conveyor roller 91 and an ejection roller 92. The conveyor roller 91 conveys the sheet S to the ejection roller 92. The ejection roller 92 ejects the sheet S onto the output tray 12.

Figure 2:
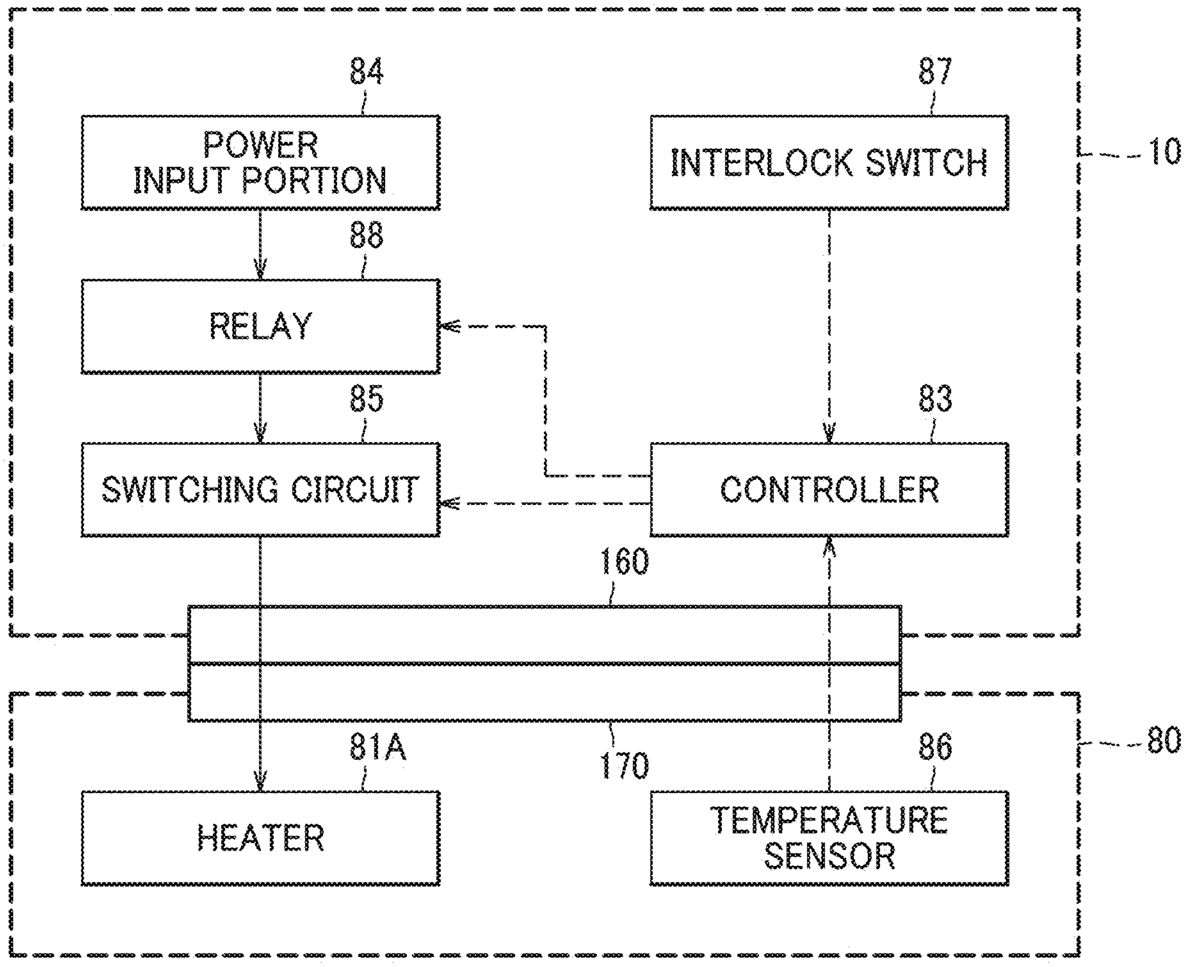
FIG. 2 is a block diagram showing electrical connections between a heater, an interlock switch, and a controller.

As shown in FIG. 2, the image forming apparatus 1 further comprises a controller 83, a power input portion 84, a switching circuit 85, a temperature sensor 86, an interlock switch 87, a relay 88, a housing connector 160 and a unit connector 170. The controller 83, the power input portion 84, the switching circuit 85, the interlock switch 87, the relay 88, and the housing connector 160 are provided at the main housing 10. The temperature sensor 86 and the unit connector 170 are provided at the fixing unit 80.

The controller 83 includes a central processing unit (CPU), a random-access memory (RAM), a read-only memory (ROM), an input/output circuit, etc., and performs various arithmetic processing based on programs and/or data stored in the ROM or other components to execute control.

The power input portion 84 is connected to an AC power source and supplies power to the switching circuit 85.

The relay 88 is provided between the power input portion 84 and the switching circuit 85. The relay 88 is switchable between a connected state in which power is supplied from the power input portion 84 to the switching circuit 85, and a shut-off state in which power is not supplied from the power input portion 84 to the switching circuit 85. The relay 88 comprises a moving contact that switches the relay 88 to the connected state and to the shut-off state, and an electromagnet that operates the moving contact. The electromagnet operates in response to a command from the controller 83 to switch the moving contact.

The switching circuit 85 comprises a semiconductor such as a triac. The switching circuit 85 is a circuit capable of supplying or shutting off power to the heater 81A, in response to a command from the controller 83.

The temperature sensor 86 measures the temperature of the heating roller 81. Information of the measured temperature of the heating roller 81 is transmitted to the controller 83. The controller 83 transmits a command to the switching circuit 85 based on the information from the temperature sensor 86.

The interlock switch 87 is a switch for allowing and shutting off power supply from the housing connector 160 to the unit connector 170. Power supply from the housing connector 160 to the unit connector 170 is allowed when the interlock switch 87 is in an on-state. Power supply from the housing connector 160 to the unit connector 170 is shut off when the interlock switch 87 is in an off-state. In other words, the interlock switch 87 allows power to be supplied to the heater 81A in the on-state, and shuts off power to the heater 81A in the off-state.

Figure 6B:
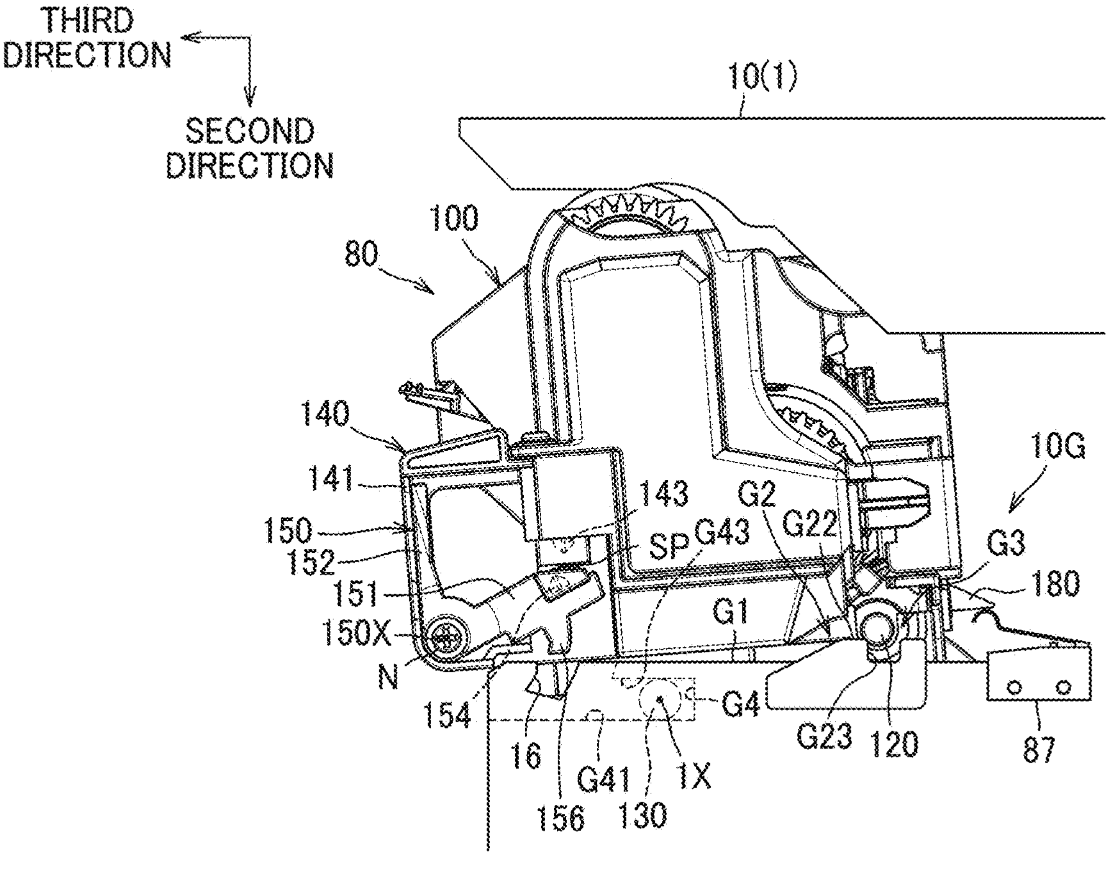
FIG. 6B is an illustration showing the process of installation of the fixing unit into the main housing, showing a state where the first reference portion has moved past an end surface.
Figure 7A:
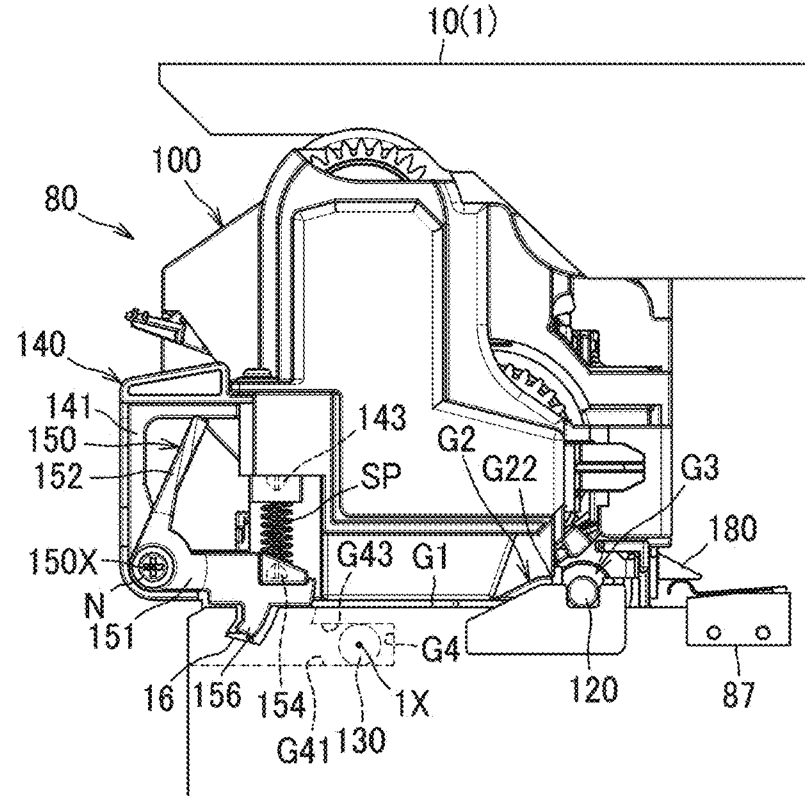
FIG. 7A is an illustration showing a state where the fixing unit is positioned in the installation position and a lever is positioned in a first lever position.

Specifically, as shown in FIG. 7A, the interlock switch 87 is positioned at approximately the same height as the lower end portion of the unit housing 100 of the fixing unit 80 positioned in an installation position and downstream of the unit housing 100 in a direction of installation of the fixing unit 80. The interlock switch 87 comprises a displaceable arm. Specifically, the arm of the interlock switch 87 is displaceable to an on-position shown in FIG. 7A and to an off-position shown in FIG. 6B. The interlock switch 87 assumes an electrically-continuous state when the arm is positioned in the on-position, and assumes an electrically-noncontinuous state when the arm is positioned in the off-position.

In the present embodiment, the controller 83 determines that the interlock switch 87 is in the on-state when the interlock switch 87 assumes the electrically-continuous state and switches the relay 88 to the connected state. The controller 83 determines that the interlock switch 87 is in the off-state when the interlock switch 87 assumes the electrically-noncontinuous state and switches the relay 88 to the shut-off state. When the relay 88 is in the shut-off state, power to the switching circuit 85 is shut off, shutting off power to the heater 81A.

The housing connector 160 is connected to the unit connector 170 when the fixing unit 80 is installed in the main housing 10. When the housing connector 160 is connected to the unit connector 170, power is suppliable from the switching circuit 85 to the heater 81A. Further, when the housing connector 160 is connected to the unit connector 170, the temperature information detected by the temperature sensor 86 is transmittable to the controller 83.

Though not shown in the figures, the housing connector 160 is rotatably held by the main housing 10. While the housing connector 160 and the unit connector 170 are connected to each other, the electrical connection between the housing connector 160 and the unit connector 170 is maintained by the housing connector 160 rotating together with the unit connector 170.

Figure 3:
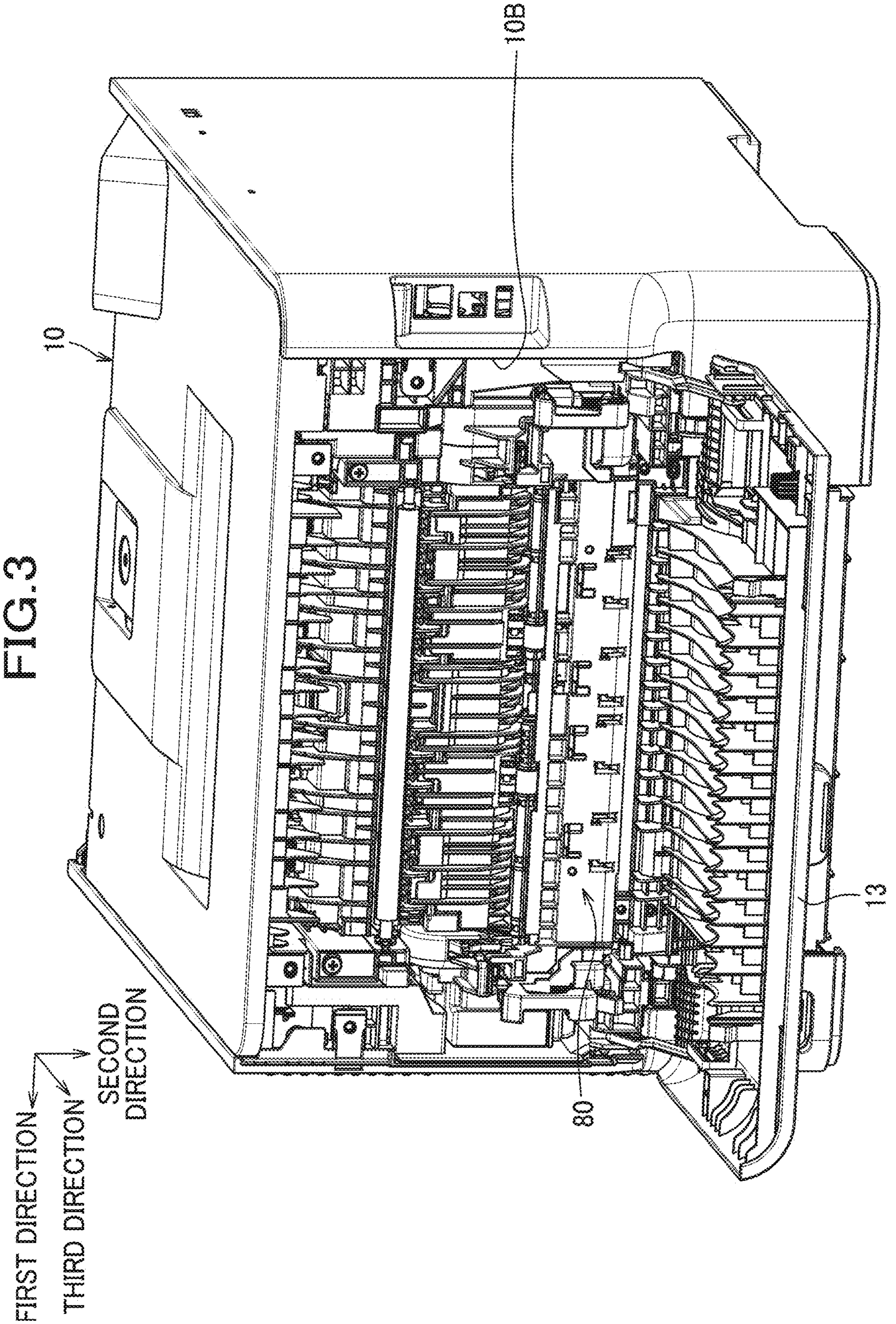
FIG. 3 is a perspective view of the image forming apparatus with a rear cover open.
Figure 4:
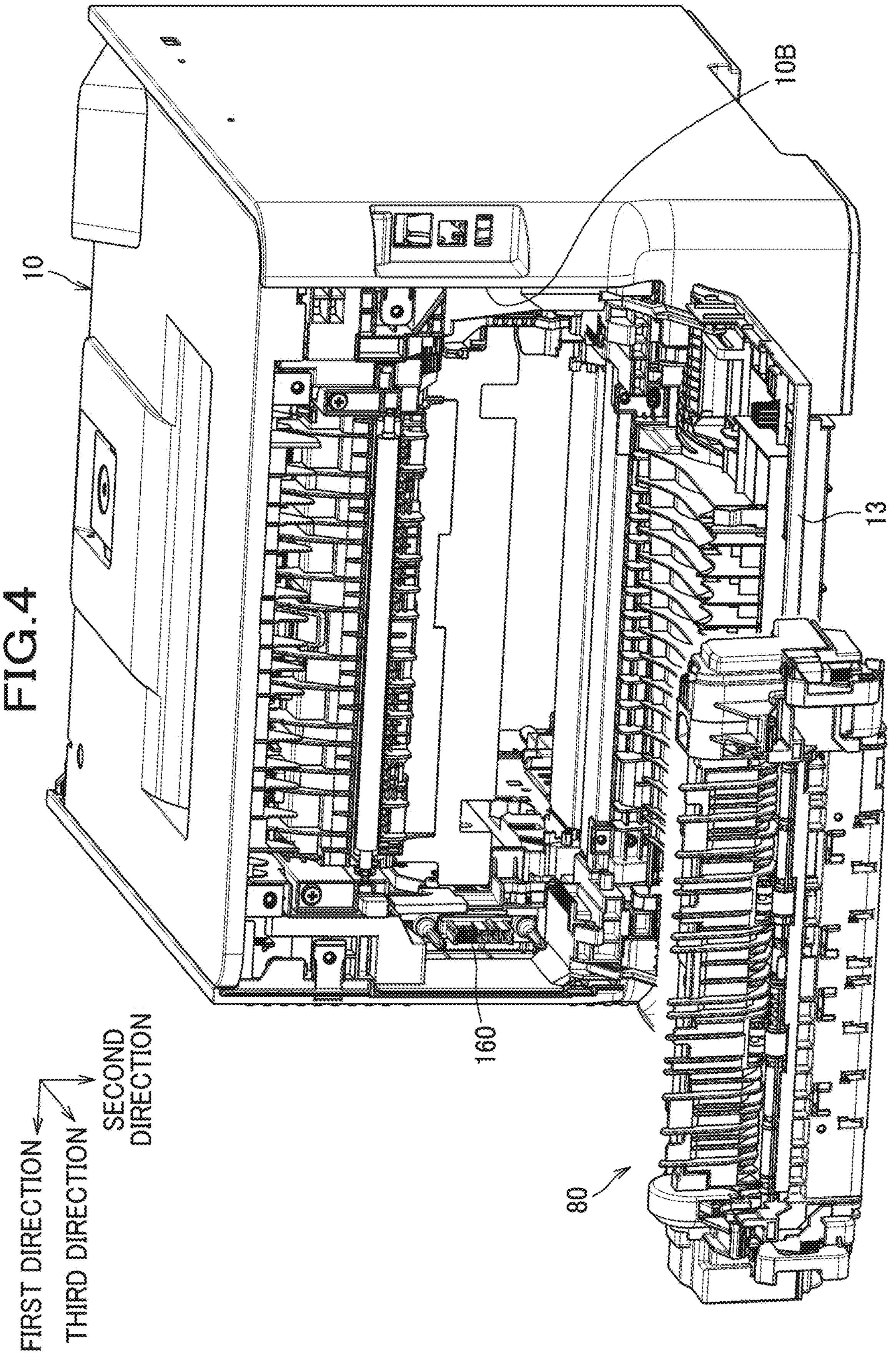
FIG. 4 is a perspective view of the image forming apparatus showing a fixing unit removed from a main housing.

As shown in FIGS. 3 and 4, the fixing unit 80 is installable into and removable from the main housing 10. Specifically, the fixing unit 80 is installable into and removable from the main housing 10 through the opening 10B of the main housing 10, which is uncovered by opening the rear cover 13. In other words, the main housing 10 supports the fixing unit 80 in a manner that allows the fixing unit 80 to be installable into and removable from the main housing 10.

In the present embodiment, a first direction is a direction along an axial direction of the heating roller 81. The first direction is also a direction along a width of the sheet S. The first direction is also a direction along a longitudinal direction of the fixing unit. The second direction is a direction perpendicular to the first direction and a direction along the vertical direction. The third direction is a direction perpendicular to the first direction and to the second direction. The third direction is an example of a predetermined direction.

The arrows that indicate the directions in the drawings point to one side in the respective directions. In the present embodiment, one side in the first direction corresponds to the right side of the image forming apparatus 1. One side in the second direction corresponds to downward in the vertical direction. One side in the third direction corresponds to a rear side of the image forming apparatus 1. The side opposite to the one side in each direction will be referred to as "the other side" in each direction.

The fixing unit 80 is removed from the installation position shown in FIG. 3 toward the one side in the third direction. In the following description, the direction in which the fixing unit 80 is removed is also referred to as a removal direction. As shown in FIG. 4, the fixing unit 80 is installed from the one side in the third direction toward the other side in the third direction. In the following description, the direction in which the fixing unit 80 is installed is also referred to as an installation direction.

Figure 5A:
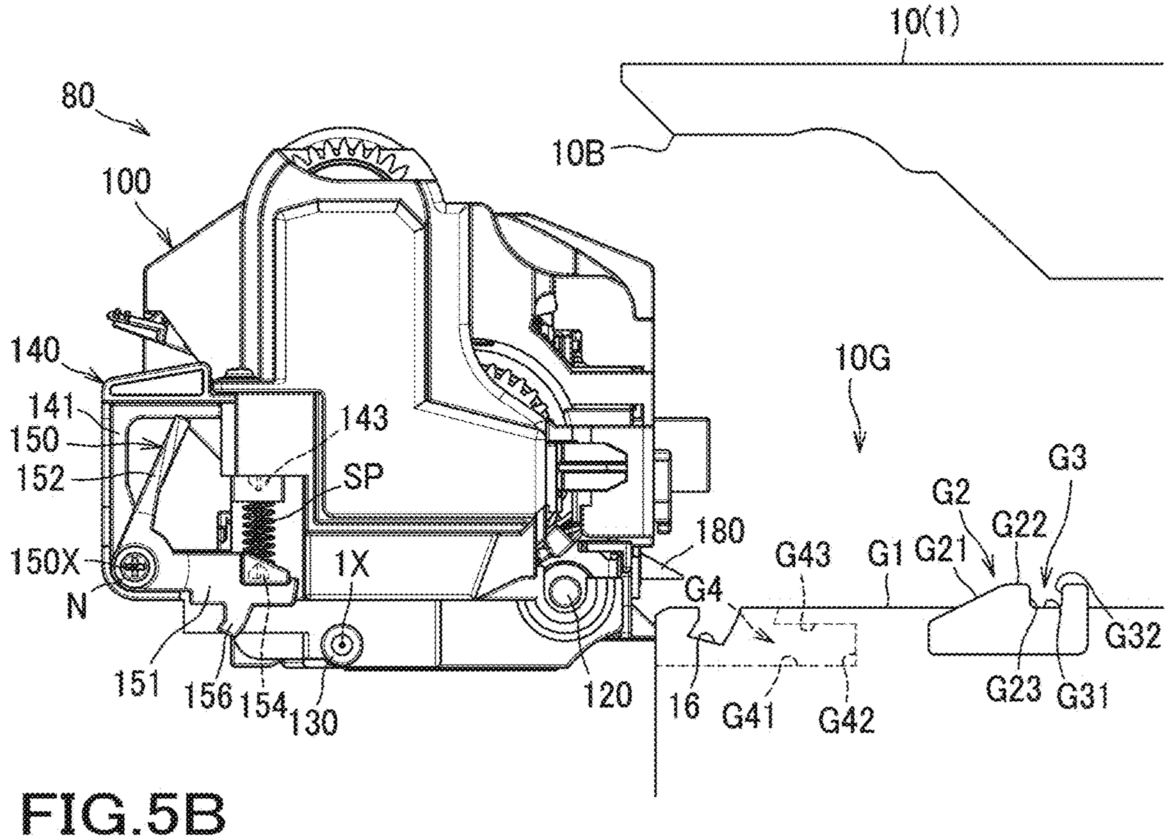
FIG. 5A is an illustration showing a state before the fixing unit is installed into the main housing.

As shown in FIG. 5A, the fixing unit 80 comprises a unit housing 100, a first reference portion 120, a second reference portion 130, a fixed handle 140, a lever 150, and a spring SP.

The first reference portion 120 is a shaft having a cylindrical outer surface. The shaft protrudes outward in the first direction. The first reference portion 120 is positioned at the side of the unit housing 100 on the one side and the other side in the first direction. The two first reference portions 120 respectively protrude toward the one side and the other side in the first direction. The first reference portions 120 are positioned at an end portion of the unit housing 100 on the one side in the second direction. The first reference portions 120 are positioned at an end portion of the unit housing 100 on the other side in the third direction. In other words, the first reference portions 120 are positioned at a downstream end of the unit housing 100 in the installation direction.

The first reference portions 120 engage a first recess G3 of the main housing 10, which will be described below, and position the fixing unit 80 in the installation position. Specifically, the first reference portions 120 are positioned in place with respect to the main housing 10 in the second direction and the third direction. The first reference portions 120 are positioned further to the other side in the third direction relative to the second reference portions 130.

The second reference portion 130 is a shaft having a cylindrical outer surface. The shaft protrudes outward in the first direction. The second reference portion 130 is positioned at the sides of the unit housing 100 on the one side and the other side in the first direction. The two second reference portions 130 respectively protrude toward the one side and the other side in the first direction. The second reference portions 130 are positioned at an end portion of the unit housing 100 on the one side in the second direction. The second reference portions 130 are positioned further to the one side in the second direction relative to the first reference portions 120. The second reference portions 130 are positioned upstream of the central portion of the fixing unit 80 in the installation direction. The fixing unit 80 is configured such that the weight of a part of the fixing unit 80 downstream of the second reference portion 130 is heavier than the weight of a part of the fixing unit 80 upstream of the second reference portion 130. In the following description, an axis extending in the first direction through centers of the second reference portions 130 is referred to as a first axis 1X.

The fixed handle 140 is a handle a user grasps when installing or removing the fixing unit 80. The fixed handle 140 is provided at the side of the unit housing 100 on the one side in the first direction and at the side of the unit housing 100 on the other side in the first direction. The two fixed handles 140 are positioned at an end of the unit housing 100 on the one side in the third direction. In other words, the fixed handles 140 are positioned at an upstream end of the unit housing 100 in the installation direction. The fixed handles 140 each comprise a grip 141 and a first protrusion 143. In FIG. 5A, the fixed handle 140 disposed at the side of the unit housing 100 on the other side in the first direction is shown. A surface of the fixed handle 140 facing the other side in the second direction is inclined such that the closer to the one side in the third direction, the lower the surface.

The grip 141 is a part of the fixed handle 140 the user can grasp when removing the fixing unit 80. The first protrusion 143 is a protrusion protruding downward. The first protrusion 143 holds one end of the spring SP.

The lever 150 is L-shaped. The lever 150 is attached to the fixed handle 140 by a screw N. The lever 150 is rotatable about a lever axis 150X between a first lever position shown in FIG. 5A and a second lever position shown in FIG. 5B. The spring SP is a compression spring positioned between the fixed handle 140 and the lever 150. The spring SP constantly biases the lever 150 from the second position toward the first position.

The lever 150 comprises a body 151, a holding portion 152, a second protrusion 154, and an engagement portion 156.

The body 151 extends along the third direction. The holding portion 152 extends diagonally to the second direction. In other words, the holding portion 152 extends in a direction different from a direction in which the body 151 extends, and forms the shape of the letter L with the body 151. The holding portion 152 is graspable when removing the fixing unit 80 from the main housing 10. When the user grasps both the grip 141 and the holding portion 152 and moves the holding portion 152 toward the grip 141, the lever 150 moves from the first lever position shown in FIG. 5A to the second lever position shown in FIG. 5B.

The second protrusion 154 is a protrusion protruding upward. The second protrusion 154 holds the other end of the spring SP.

The engagement portion 156 is a protrusion that extends from an end portion of the body portion 151 on the other side in the third direction toward the one side in the second direction. The engagement portion 156 protrudes in the direction of rotation of the lever 150. In the present embodiment, the engagement portion 156 is shaped as a hook having an end bent in the removal direction.

The main housing 10 has an engagement hole 16. The engagement hole 16 is positioned on an inner wall surface of the main housing 10. The engagement hole 16 is a hole in which the engagement portion 156 is received when the fixing unit 80 is installed in the main housing 10 with the lever 150 positioned in the first lever position. The engagement hole 16 restrains the fixing unit 80 from being disengaged from the main housing 10 when the engagement portion 156 is received in the engagement hole 16.

A switch contacting portion 180 is positioned at an end of the unit housing 100 on the other side in the third direction and on the one side in the second direction. As shown in FIG. 7A, when the fixing unit 80 is positioned in the installation position, the switch contacting portion 180 contacts an arm of the interlock switch 87. When the switch contacting portion 180 contacts the arm of the interlock switch 87, the interlock switch 87 assumes the on-state and power is suppliable to the heater 81A, as described above.

As shown in FIG. 5A, when the fixing unit 80 is not positioned in the installation position, the switch contacting portion 180 does not contact the arm of the interlock switch 87. When the switch contacting portion 180 does not contact the arm of the interlock switch 87, the interlock switch 87 assumes the off-state and power is not suppliable to the heater 81A, as described above.

The main housing 10 comprises a guide 10G configured to guide the fixing unit 80. The guide 10G is provided at the side of the main housing 80 facing the one side in the first direction and the side of the main housing 80 facing the other side in the first direction. Each guide 10G comprises a first guide surface G1, a protrusion G2, a first recess G3, and a second recess G4.

The guide surface G1 is a surface that guides the first reference portion 120 of the fixing unit 80. The guide surface G1 is perpendicular to the second direction. The guide surface G1 contacts the first reference portion 120 from below in the process of installing or removing the fixing unit 80.

The protrusion G2 protrudes upward from the guide surface G1. The protrusion G2 has an inclined surface G21, an end surface G22, and a reference surface G23.

The inclined surface G21 is positioned on an end portion of the protrusion G2 on the one side in the third direction. In other words, the inclined surface G21 is positioned at an upstream end portion of the protrusion G2 in the installation direction of the fixing unit 80. The inclined surface G21 is inclined with respect to the guide surface G1. Specifically, the inclined surface G21 is inclined such that the closer to a downstream side in the installation direction, the higher the inclined surface G21.

The end surface G22 extends from a downstream end of the inclined surface G21 in the installation direction toward the downstream side in the installation direction. The reference surface G23 extends downward from the downstream end of the end surface G22 in the installation direction. The reference surface G23 is perpendicular to the third direction. The reference surface G23 is positioned downstream of the protrusion G2 in the installation direction. The reference surface G23 is in contact with the first reference portion 120 in the state where the fixing unit 80 is installed in the main housing 10.

The first recess G3 is recessed downward from the end surface G22 of the protrusion G2. In a state where the fixing unit 80 is installed in the main housing 10, the first reference portion 120 is positioned in the first recess G3. The first recess G3 has the reference surface G23 described above, a second reference surface G31, and a stopper surface G32.

The second reference surface G31 is non-parallel to the reference surface G23. Specifically, the second reference surface G31 is perpendicular to the reference surface G23. The second reference surface G31 extends from a downward end of the reference surface G23 toward the downstream side in the installation direction. The second reference surface G31 is perpendicular to the second direction. The second reference surface G31 is in contact with the reference portion 120 in the state where the fixing unit 80 is installed in the main housing 10.

The stopper surface G32 extends upward from the downstream end of the second reference surface G31. The stopper surface G32 contacts the first reference portion 120 at the time of installation of the fixing unit 80 and restrains the first reference portion 120 from moving toward the downstream side in the installation direction.

The second recess G4 is a recess in which the second reference portion 130 is positioned when the fixing unit 80 is installed in the main housing 10. The second recess G4 opens upstream in the installation direction. The second recess G4 has a first restraining surface G41, a bottom surface G42, and a second restraining surface G43.

The first restraining surface G41 is in contact with the second reference portion 130 to restrain the second reference portion 130 from moving downward in the state where the fixing unit 80 is installed in the main housing 10. The first restraining surface G41 is perpendicular to the second direction. The first restraining surface G41 is in contact with the second reference portion 130 from below in the state where the fixing unit 80 is installed in the main housing 10. The first restraining surface G41 extends further upstream relative to the second restraining surface G43 in the installation direction.

The bottom surface G42 extends upward from the downstream end of the first restraining surface G41 in the installation direction. The second restraining surface G43 extends upstream in the installation direction from the upward end of the bottom surface G42. The second restraining surface G43 is in contact with the second reference portion 130 to restrain the second reference portion 130 from moving upward in the state where the fixing unit 80 is installed in the main housing 10.

In the state where the fixing unit 80 is installed in the main housing 10, the second reference portion 130 is positioned between the first restraining surface G41 and the second restraining surface G43. The first restraining surface G41 and the second restraining surface G43 are surfaces that stop the fixing unit 80 installed in the main housing 10 from rotating about the first reference portion 120.

Next, the operation of installing and removing the fixing unit 80 will be described. First, the process of installing the fixing unit 80 into the main housing 10 will be described.

In the present embodiment, the fixing unit 80 is installed into the main housing 10 by a first process and a second process.

The first process is a process where the fixing unit 80 is inserted into the main housing 10 by sliding the fixing unit 80 in the installation direction. Specifically, it is a process from the state shown in FIG. 5A to the state shown in FIG. 5B and then to the state shown in FIG. 6A. When the fixing unit 80 is moved in the installation direction from the state shown in FIG. 5A, the first reference portion 120 contacts the guide surface G1 as shown in FIG. 5B, and the fixing unit 80 slides along the guide surface G1 in the installation direction and is guided into the main housing 10.

Figure 5B:
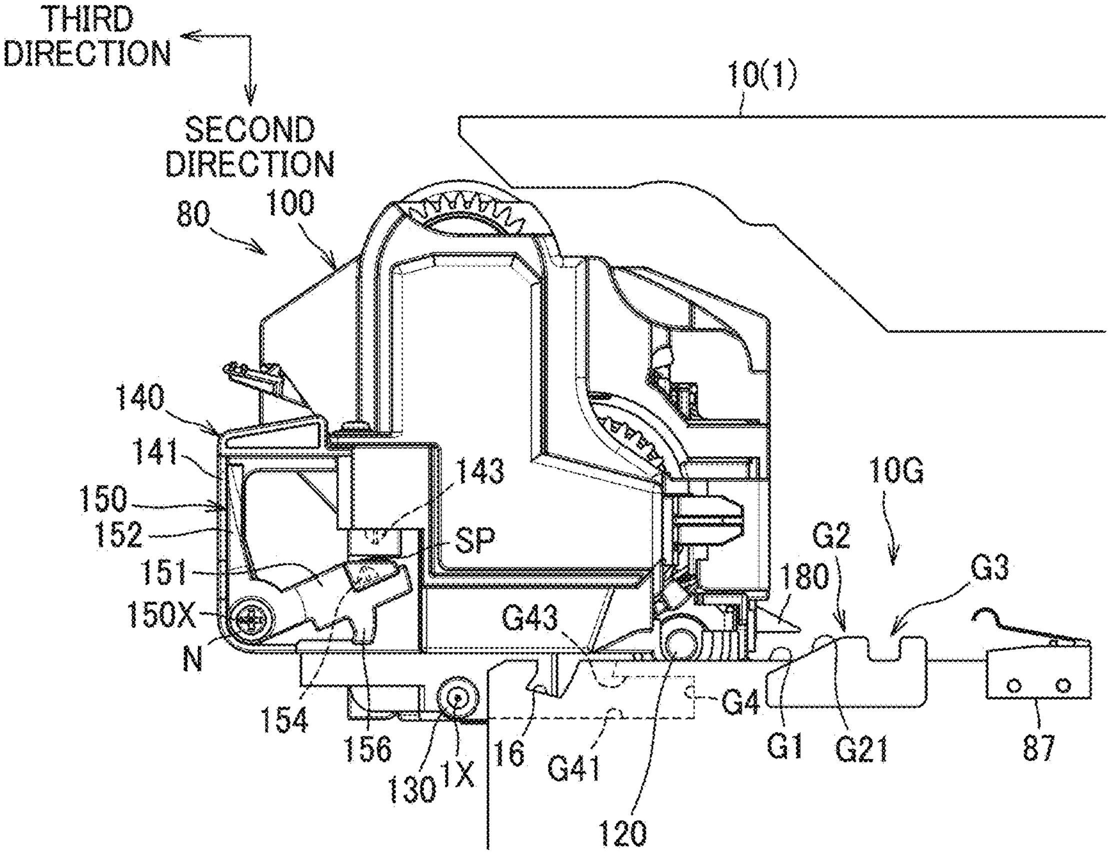
FIG. 5B is an illustration showing a process of installation of the fixing unit into the main housing, showing a state where a first reference portion is in contact with a guide surface.

When the fixing unit 80 is moved further in the installation direction from the state shown in FIG. 5B, the second reference portion 130 contacts the first restraining surface G41. Thereby, the fixing unit 80 contacts the first restraining surface G41 and is guided by the first restraining surface G41 toward the installation position. In other words, the fixing unit 80 is guided toward the installation position by the first reference portion 120 contacting the guide surface G1 and the second reference portion 130 contacting the first restraining surface G41. During this process, since the guide surface G1 and the first restraining surface G41 are parallel to each other, the fixing unit 80 slides straight in the third direction without rotating until the first reference portion 120 contacts the inclined surface G21. The process from the start of the installation of the fixing unit 80 until the first reference portion 120 contacts the inclined surface G21 is the first process.

Figure 6A:
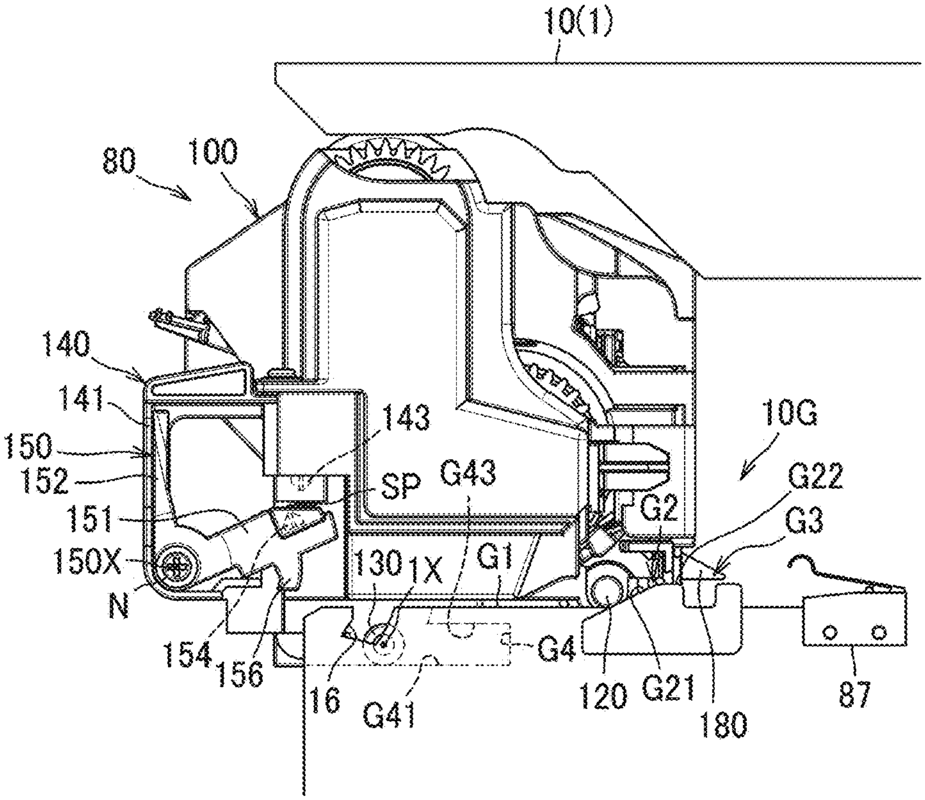
FIG. 6A is an illustration showing the process of installation of the fixing unit into the main housing, showing a state where the first reference portion is in contact with an inclined surface.

As shown in FIG. 6A, when the fixing unit 80 is moved further in the installation direction in the state where the first reference portion 120 is in contact with the inclined surface G21, the first reference portion 120 is lifted upward with the second reference portion 130 being retained by the restraining surface G41. This causes the fixing unit 80 to rotate in the counterclockwise direction of FIG. 6B and move in the installation direction as the first reference portion 120 is guided by the inclined surface G21. In other words, as the fixing unit 80 moves in the installation direction from the state of FIG. 6A, the fixing unit 80 is inserted into the main housing 10 with the surface of the fixing unit 80 facing the downstream side in the installation direction facing diagonally upward, as shown in FIG. 6B.

From the state shown in FIG. 6A, the reference portion 120 is guided by the inclined surface G21 and then guided by the end surface G22 in a direction along the third direction. Since the part of the fixing unit 80 positioned downstream of the first axis 1X in the installation direction is heavier than the part of the fixing unit 80 positioned upstream of the first axis 1X in the installation direction, the first reference portion 120 enters the first recess G3 under the force of gravity, as shown in FIG. 7A, after the first reference portion 120 moves past the end surface G22. At this point, since the second reference portion 130 is still held in the second recess G4, the fixing unit 80 moves to the installation position by rotating about the first axis 1X in the clockwise direction.

As described above, the process in which the fixing unit 80 moves to the installation position by rotating about the first axis 1X is the second process. That is, in the second process, the fixing unit 80 moves to the installation position by a movement different from the sliding movement of the fixing unit 80 in the first process. In the second process, the switch contacting portion 180 moves downward. The switch contacting portion 180 does not contact the interlock switch 87 in the first process, but the switch contacting portion 180 contacts the interlock switch 87 in the second process and switches the interlock switch 87 from the off-state to the on-state.

Figure 7B:
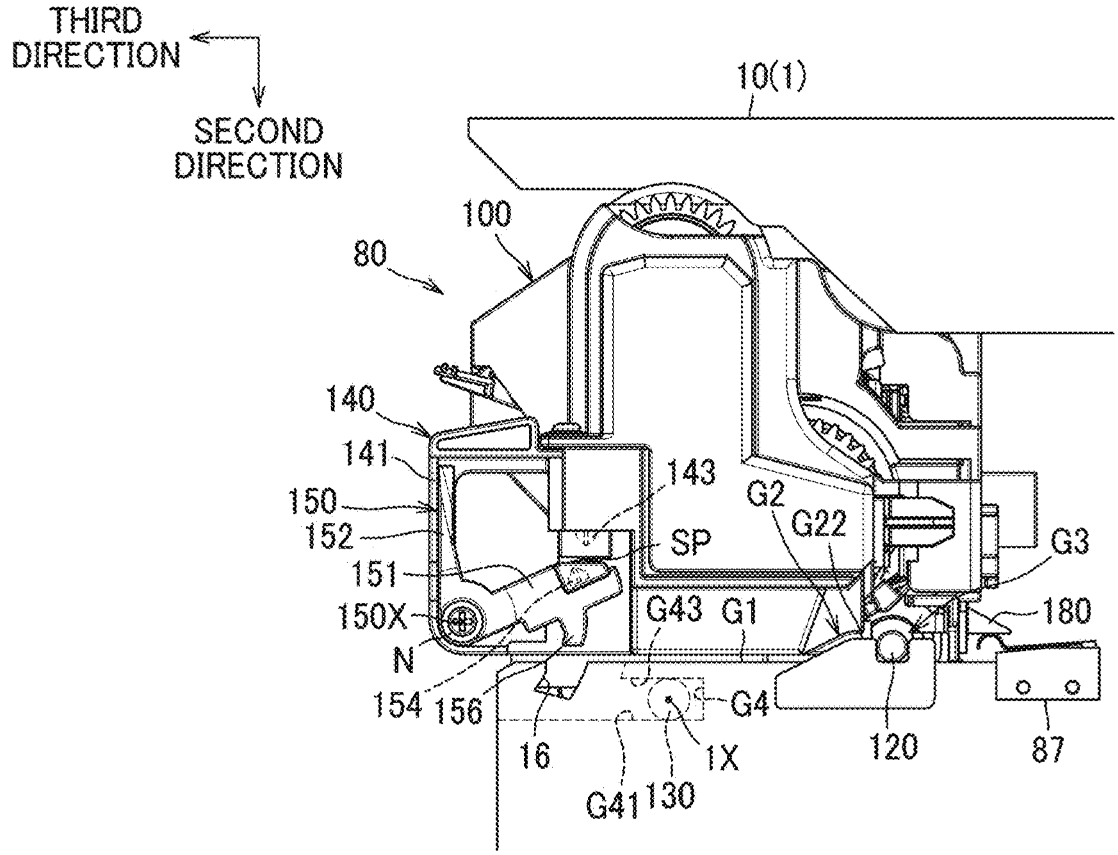
FIG. 7B is an illustration showing a state where the fixing unit is positioned in the installation position and the lever is positioned in a second lever position.

If the user removes his/her hand from the lever 150 while the fixing unit 80 is in the installation position, the lever 150 moves from the second lever position shown in FIG. 7B to the first lever position shown in FIG. 7A by the biasing force of the spring SP. As shown in FIG. 7A, when the lever 150 moves to the first lever position, the engagement portion 156 enters the engagement hole 16, and the fixing unit 80 cannot be disengaged from the main housing 10 unless the user grasps the lever 150.

In the first process, the unit connector 170 is connected to the housing connector 160.

In the second process, the unit connector 170 rotates with the housing connector 160 and maintains the connection with the housing connector 160.

Next, the process of removing the fixing unit 80 from the main housing 10 will be described.

In the present embodiment, the fixing unit 80 is removed from the main housing 10 by a third process and a fourth process. The third process is a process corresponding to the second process. The fourth process is a process corresponding to the first process.

When the fixing unit 80 is in the installation position, the engagement portion 156 of the lever 150 is engaged with the engagement hole 16. As shown in FIG. 7B, when the user grasps the lever 150 and rotates the lever 150 in the counterclockwise direction, the lever 150 moves from the first lever position to the second lever position and the engagement portion 156 inserted in the engagement hole 16 is moved outside of the engagement hole 16. Thereby, the fixing unit 80 becomes removable from the main housing 10.

If the user tries to remove the fixing unit 80 from the main housing 10 without grasping the lever 150, the user pulls the grip 141 of the fixed handle 140 downward in the state shown in FIG. 7A. As a result, the fixing unit 80 rotates about the first axis 1X in the counterclockwise direction. However, since the engagement portion 156 remains inserted in the engagement hole 16, the fixing unit 80 cannot be moved in the removal direction.

The third process is a process where the fixing unit 80 moves from the installation position by a movement different from a sliding movement in the removal direction. Specifically, the third process is a process where the fixing unit 80 moves from the installation position to a removal position by rotating about the first axis 1X.

In more detail, in the third process, the user grasps and pulls the grip 141 and the lever 150 downward from the state in FIG. 7B. As a result, the fixing unit 80 rotates about the first axis 1X in the counterclockwise direction, as shown in FIG. 6B. At this point, the fixing unit 80 rotates in a direction in which the lever axis 150X moves downward and the first reference portion 120 moves upward. This rotation causes the first reference portion 120 to move out of the first recess G3. Thus, the first reference portion 120 is not restrained by the reference portion G23, and the fixing unit 80 can be moved in the removal direction.

In the third process, the switch contact portion 180 moves upward. In the third process, the switch contact portion 180 contacting the interlock switch 87 is separated from the interlock switch 87 and switches the interlock switch 87 from the on-state to the off-state.

In the third process, the housing connector 160 and the unit connector 170 tilt in the second direction with respect to the main housing 10, but the electrical connection of the housing connector 160 and the unit connector 170 is maintained.

The fourth process is a process that follows the third process, where the fixing unit 80 slides in the removal direction and is guided to the outside of the main housing 10. Specifically, the fourth process is a process from the state shown in FIG. 6A to the state shown in FIG. 5B and then to the state shown in FIG. 5A.

In more detail, the user pulls the fixing unit 80 in the removal direction in the state shown in FIG. 6B while grasping the grip 141 and the holding portion 152. As a result, the fixing unit 80 moves in the removal direction as shown in FIG. 6A and the first reference portion 120 contacts the inclined surface G21. As the first reference portion 120 is guided by the inclined surface G21, the fixing unit 80 rotates in the clockwise direction. The unit connector 170 is disconnected from the housing connector 160 in the process the fixing unit 80 moving in the removal direction.

When the grip 141 is pulled further in the removal direction, as shown in FIG. 5B, the fixing unit 80 moves further in the removal direction, and the reference portion 120 contacts the guide surface G1. At this point, since the second reference portion 130 is retained by the first restraining surface G41, the fixing unit 80 is guided toward the outside of the housing 10 with the first reference portion 120 contacting the guide surface G1 and the third reference portion 130 contacting the first restraining surface G41. Since the guide surface G1 and the first restraining surface G41 are parallel to each other, the fixing unit 80 does not rotate and slides straight in the third direction. As is described above, the process from when the fixing unit 80 contacts the guide surface G1 until the fixing unit 80 is removed from the main housing 10 is the fourth process.

Further, when the fixing unit 80 is guided by the guide 10G, the fixing unit 80 contacts the main housing 10 in the first direction. Thus, the fixing unit 80 is restrained from moving in the first direction when the fixing unit 80 is being guided by the guide 10G.

Figure 8:
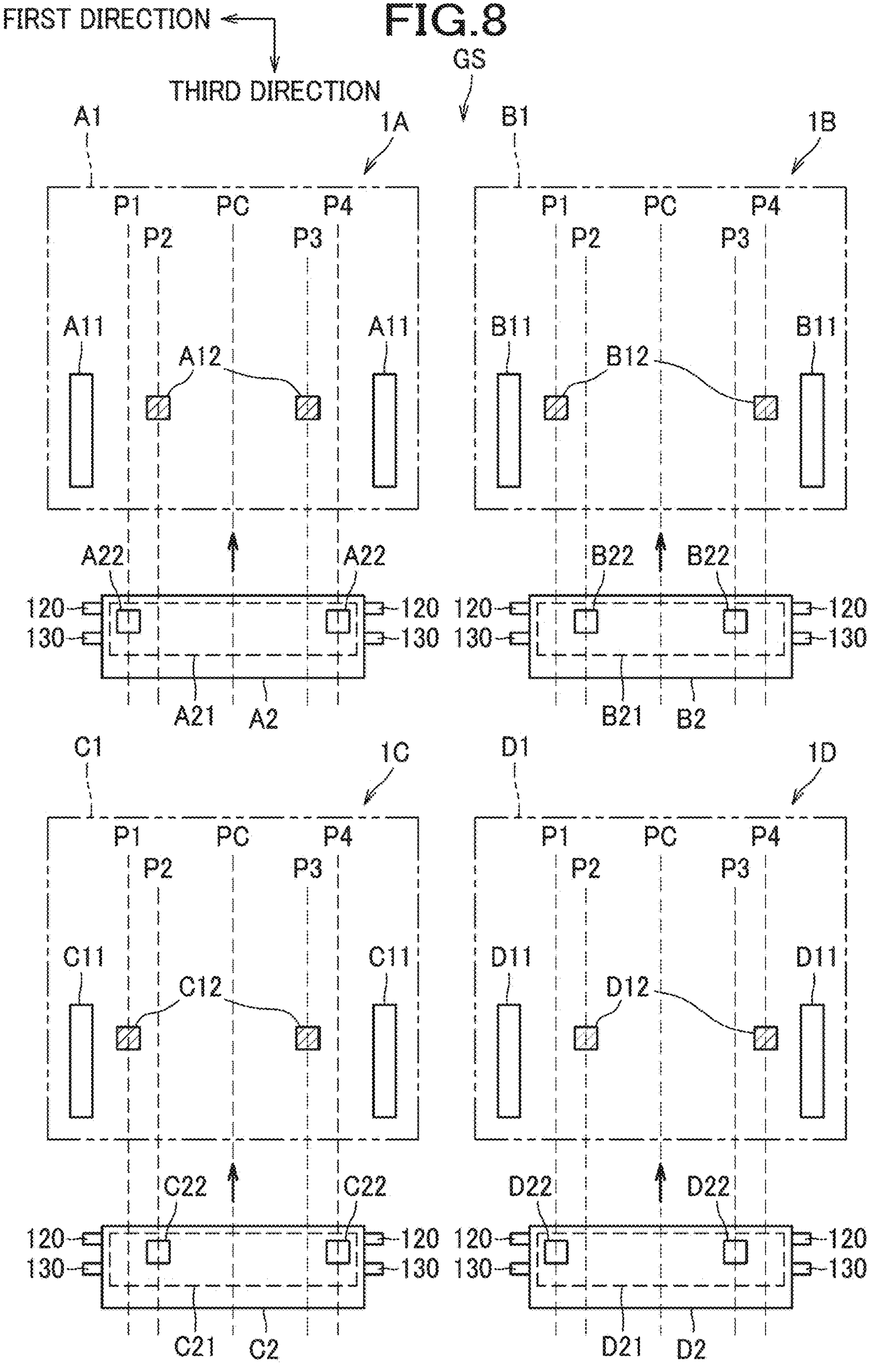
FIG. 8 is an illustration showing an image forming system.

As shown in FIG. 8, an image forming system GS comprises a first image forming apparatus 1A, a second image forming apparatus 1, a third image forming apparatus 1C, and a fourth image forming apparatus 1D. The first image forming apparatus 1A, the second image forming apparatus 1B, the third image forming apparatus 1C, and the fourth image forming apparatus 1D each comprises the components of the image forming apparatus 1 described above, but each has a specification different from the other image forming apparatuses. The specification includes a voltage of a power supply for each image forming apparatus. For example, a voltage of a power supply for each of the first image forming apparatus 1A, the second image forming apparatus 1B, the third image forming apparatus 1C, and the fourth image forming apparatus 1D is different.

The first image forming apparatus 1A comprises a first main housing A1 and a first fixing unit A2 installable into and removable from the first main housing A1. The first fixing unit A2 is configured to operate at a voltage of a power supply for the first image forming apparatus 1A. The second image forming apparatus 1B comprises a second main housing B1 and a second fixing unit B2 installable into and removable from the second main housing B1. The second fixing unit B2 is configured to operate at a voltage of a power supply for the second image forming apparatus 1B.

The third image forming apparatus 1C comprises a third main housing C1 and a third fixing unit C2 installable into and removable from the third main housing C1. The third fixing unit C2 is configured to operate at a voltage of a power supply for the third image forming apparatus 1C. The fourth image forming apparatus 1D comprises a fourth main housing D1 and a fourth fixing unit D2 installable into and removable from the fourth main housing D1. The fourth fixing unit D2 is configured to operate at a voltage of a power supply for the fourth image forming apparatus 1D.

The first main housing A1 has two first guides A11 and two first housing contact portions A12. The second main housing B1 has two second guides B11 and two second housing contact portions B12.

The third main housing C1 has two third guides C11 and two third housing contact portions C12. The fourth main housing D1 has two fourth guides D11 and two fourth housing contact portions D12.

Each of the first guides All, the second guides B11, the third guides C11, and the fourth guides D11 has the same structure as the guide 10G described above. On the other hand, each of the first fixing unit A2, the second fixing unit B2, the third fixing unit C2, and the fourth fixing unit D2 has the two first reference portions 120 and the two second reference portions 130 described above.

Thus, the first guide A11 is capable of guiding the first fixing unit A2, the second fixing unit B2, the third fixing unit C2, and the fourth fixing unit D2 in the third direction. Each of the second guide B11, the third guide C11, and the fourth guide D11 is capable of guiding the first fixing unit A2, the second fixing unit B2, the third fixing unit C2, and the fourth fixing unit D2 in the third direction in a similar manner.

Each of the first housing contact portions A12, the second housing contact portions B12, the third housing contact portions C12, and the fourth housing contact portions D12 is provided at a position in the first direction according to the different specifications of the image forming apparatus. Specifically, the fixing unit 80 has a central portion PC in the longitudinal direction, and each housing contact portion is positioned in either a first position P1, a second position P2, a third position P3, and a fourth position P4 with reference to the central portion PC of the fixing unit 80 installed in the main housing 10.

The first position P1 and the second position P2 are positioned at a side of the central portion PC on the one side in the first direction. The first position P1 is positioned farther, than the second position P2, from the central portion PC in the first direction.

The third position P3 and the fourth position P4 are positioned at the side of the central portion PC on the other side in the first direction. The fourth position P4 is positioned farther, than the third position P3, from the central portion PC in the first direction.

The distance from the first position P1 to the central portion PC in the first direction is equal to the distance from the fourth position P4 to the central portion PC in the first direction. The distance from the second position P2 to the central portion PC in the first direction is equal to the distance from the third position P3 to the central portion PC in the first direction.

One of the two first housing contact portions A12 is positioned at the second position P2, and the other first housing contact portion A12 is positioned at the third position P3.

One of the two second housing contact portions B12 is positioned at the first position P1, and the other second housing contact portion B12 is positioned at the fourth position P4.

One of the two third housing contact portions C12 is positioned at the first position P1, and the other third housing contact portion C12 is positioned at the third position P3.

One of the two fourth housing contact portions D12 is positioned at the second position P2, and the other fourth housing contact portion D12 is positioned at the fourth position P4.

The first fixing unit A2 comprises a first heating roller A21 having the same shape as the heating roller 81 described above, and two first unit contact portions A22. The first unit contact portions A22 are provided within the range of the first heating roller A21 in the first direction.

When the first fixing unit A2 is installed in the first main housing Al, the first unit contact portions A22 are positioned at positions different from those of the first housing contact portions A12 in the first direction. Specifically, one of the two first unit contact portions A22 is positioned at the first position P1, and the other first unit contact portion A22 is positioned at the fourth position P4. In other words, the first fixing unit A2 has the first unit contact portions A22 at positions corresponding to the two second housing contact portions B12.

Thus, in a situation where one attempts to install the first fixing unit A2 into the second main housing B1 by mistake, the two first unit contact portions A22 each contacts the corresponding second housing contact portion B12 in a process where the first fixing unit A2 is guided by the second guide B11. Thereby, installation of the first fixing unit A2 into the second main housing B1 is interfered with.

In a situation where one attempts to install the first fixing unit A2 into the third main housing C1 by mistake, the first unit contact portion A22 positioned at the first position P1 contacts the third housing contact portion C12 positioned at the first position P1 in a process where the first fixing unit A2 is guided by the third guide C11. Thereby, installation of the first fixing unit A2 into the third main housing C1 is also interfered with. Further, in a situation where one attempts to install the first fixing unit A2 into the fourth main housing D1 by mistake, the first unit contact portion A22 positioned at the fourth position P4 contacts the fourth housing contact portion D12 positioned at the fourth position P4 in a process where the first fixing unit A2 is guided by the fourth guide D11. Thereby, installation of the first fixing unit A2 into the fourth main housing D1 is also interfered with.

The second fixing unit B2 comprises a second heating roller B21 having the same shape as the heating roller 81 described above, and two second unit contact portions B22. The second unit contact portions B22 are provided within the range of the second heating roller B21 in the first direction.

When the second fixing unit B2 is installed in the second main housing B1, the second unit contact portions B22 are positioned at positions different from those of the second housing contact portions B12 in the first direction. Specifically, one of the two second unit contact portions B22 is positioned at the second position P2, and the other second unit contact portion B22 is positioned at the third position P3. In other words, the second fixing unit B2 has the second unit contact portions B22 at positions corresponding to the two first housing contact portions A12.

Thus, in a situation where one attempts to install the second fixing unit B2 into the first main housing A1 by mistake, the two second unit contact portions B22 each contacts the corresponding first housing contact portion A12 in a process where the first reference portion 120 and the second reference portion 130 of the second fixing unit B2 are guided by the first guide A11. Thereby, installation of the second fixing unit B2 into the first main housing A1 is interfered with.

In a situation where one attempts to install the second fixing unit B2 into the third main housing C1 by mistake, the second unit contact portion B22 positioned at the third position P3 contacts the third housing contact portion C12 positioned at the third position P3 in a process where the second fixing unit B2 is guided by the third guide C11. Thereby, installation of the second fixing unit B2 into the third main housing C1 is also interfered with. Further, in a situation where one attempts to install the second fixing unit B2 into the fourth main housing D1 by mistake, the second unit contact portion B22 positioned at the second position P2 contacts the fourth housing contact portion D12 positioned in the second position P2 in a process where the second fixing unit B2 is guided by the fourth guide D11. Thereby, installation of the second fixing unit B2 into the fourth main housing D1 is also interfered with.

The third fixing unit C2 comprises a third heating roller C21 having the same shape as the heating roller 81 described above, and two third unit contact portions C22. The third unit contact portions C22 are provided within the range of the third heating roller C21 in the first direction.

One of the two third unit contact portions C22 is positioned at the second position P2 and the other third contact portion C22 is positioned at the fourth position P4. Thus, in a situation where one attempts to install the third fixing unit C2 into the first main housing A1 by mistake, the third unit contact portion C22 positioned at the second position P2 contacts the first housing contact portion A12 positioned at the second position P2.

In a situation where one attempts to install the third fixing unit C2 into the second main housing B1 by mistake, the third unit contact portion C22 positioned at the fourth position P4 contacts the second housing contact portion B12 positioned at the fourth position P4. In a situation where one attempts to install the third fixing unit C2 into the fourth main housing D1 by mistake, the two third unit contact portions C22 each contacts the corresponding fourth housing contact portion D12. Thus, installation of the third fixing unit C2 into the main housings other than the third main housing C1 is interfered with.

The fourth fixing unit D2 comprises a fourth heating roller D21 having the same shape as the heating roller 81 described above, and two fourth unit contact portions D22. The fourth unit contact portions D22 are provided within the range of the fourth heating roller D21 in the first direction.

One of the two fourth unit contact portions D22 is positioned at the first position P1 and the other fourth unit contact portion D22 is positioned at the third position P3. Thus, in a situation where one attempts to install the fourth fixing unit D2 into the first main housing A1 by mistake, the fourth unit contact portion D22 positioned at the third position P3 contacts the first housing contact portion A12 positioned at the third position P3.

In a situation where one attempts to install the fourth fixing unit D2 into the second main housing B1 by mistake, the fourth contact portion D22 positioned at the first position P1 contacts the second housing contact portion B12 positioned at the first position P1. In a situation where one attempts to install the fourth fixing unit D2 into the third main housing C1 by mistake, the two fourth unit contact portions D22 each contacts the corresponding third housing contact portion C12. Thus, installation of the fourth fixing unit D2 into the main housings other than the fourth main housing D1 is interfered with.

One example of structures of the housing contact portion and the unit contact portion is described below.

Figure 9A:
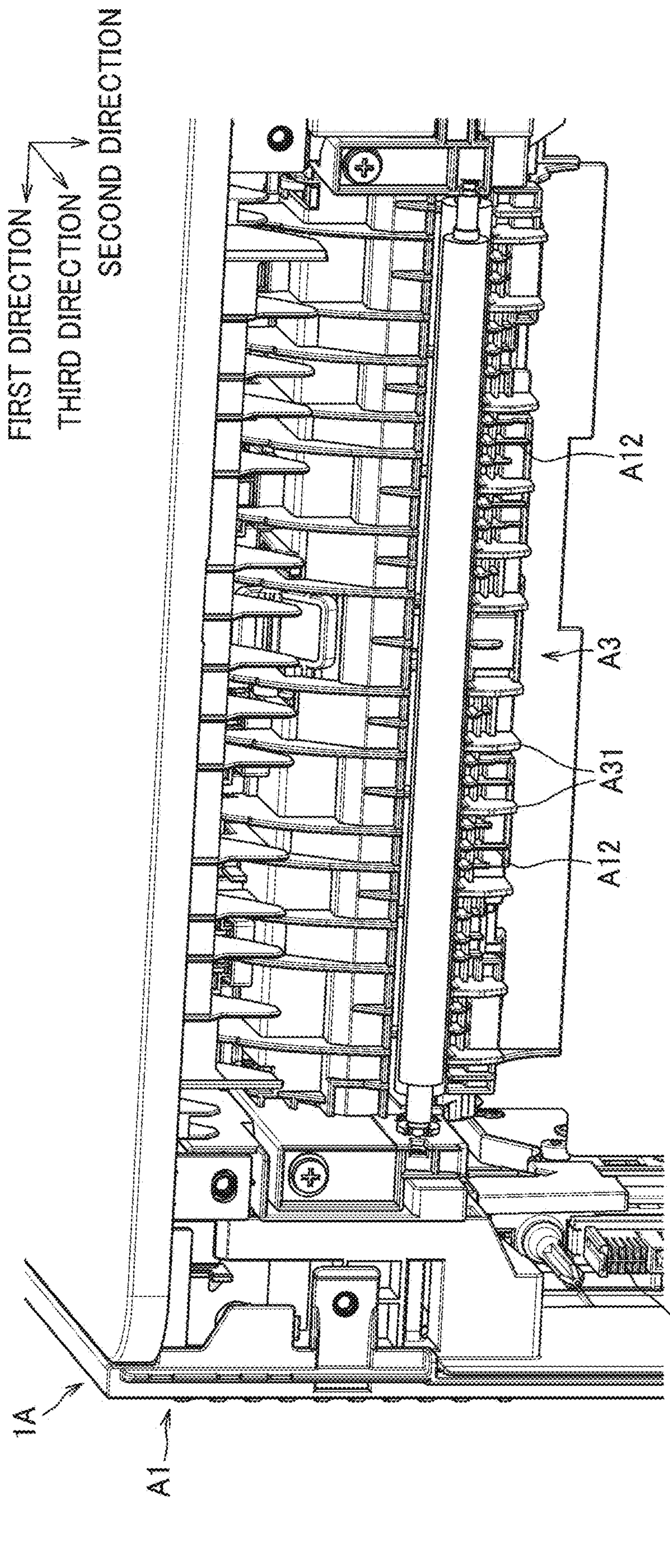
FIG. 9A is an illustration showing an example of a first housing contact portion.

As shown in FIG. 9A, the first main housing A1 comprises a first sheet guide A3 as an example of a first member. The first sheet guide A3 is a member elongated in the first direction.

The first sheet guide A3 has the two first housing contact portions A12 and a plurality of conveyance ribs A31. The first housing contact portions A12 are formed as ribs protruding in the third direction.

The conveyance ribs A31 are ribs that guide a sheet S ejected from the first fixing unit A2. The conveyance ribs A31 protrude further, than the first contact portions A12, toward the one side in the third direction. The two first housing contact portions A12 are each provided between a pair of conveyance ribs A31.

Figure 9B:
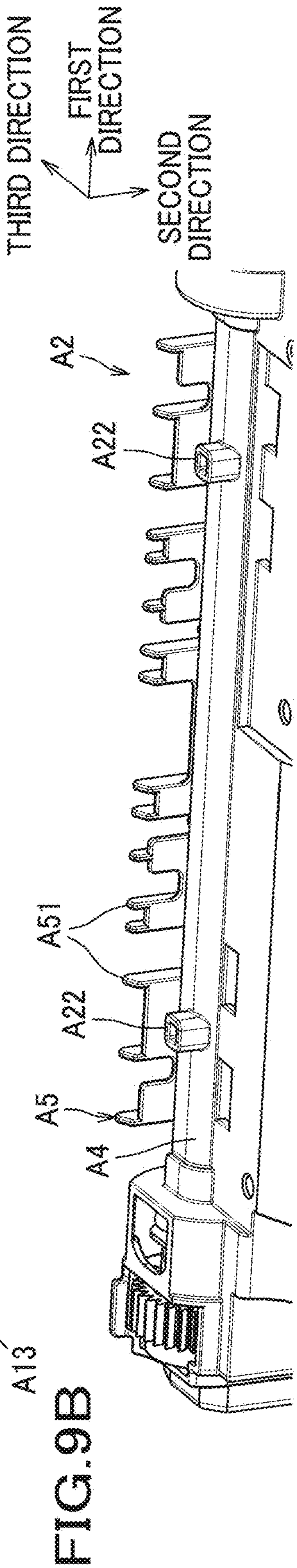
FIG. 9B is an illustration showing an example of a first unit contact portion.
Figure 13A:
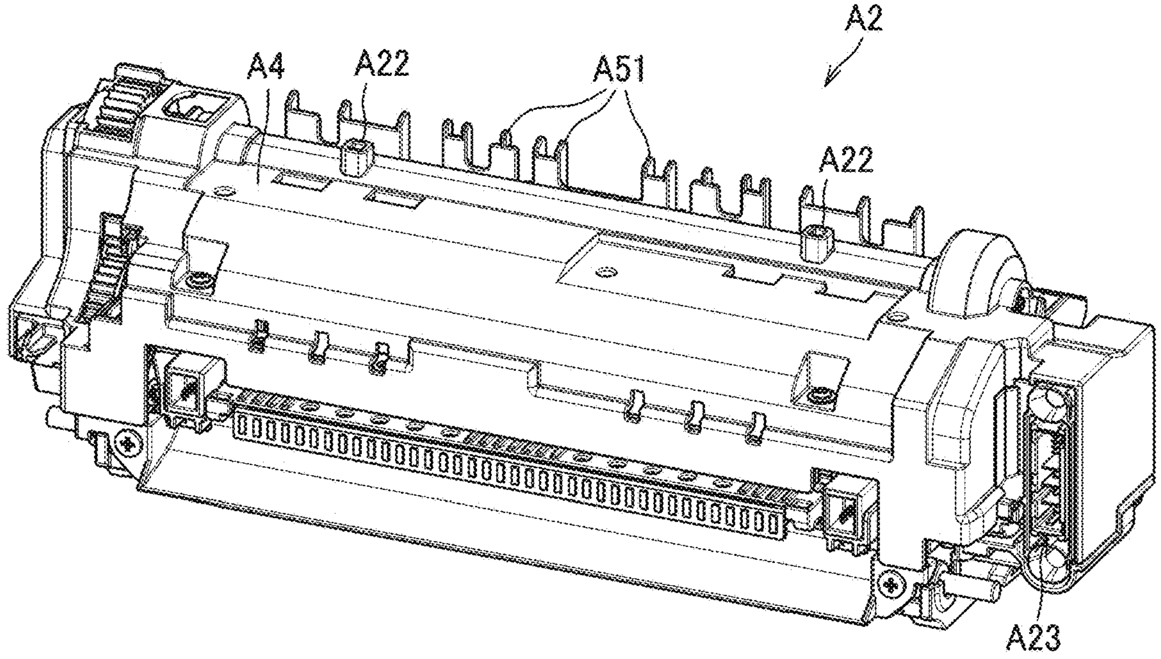
FIG. 13A is a perspective view of the first fixing unit as seen from the front side.

As shown in FIG. 9B and FIG. 13A, the first fixing unit A2 comprises a first outer cover A4 forming an outer surface of the first fixing unit A2. The first outer cover A4 is made of plastic. Specifically, the first outer cover A4 forms a front surface and an upper surface of the first fixing unit A2. The first outer cover A4 has the two first unit contact portions A22.

Each first unit contact portion A22 is formed integrally with the first outer cover A4. Each first unit contact portion A22 is a protrusion protruding in a direction non-parallel to the first direction. Specifically, each first unit contact portion A22 protrudes upward from the upper surface of the first fixing unit A2.

Figure 11:
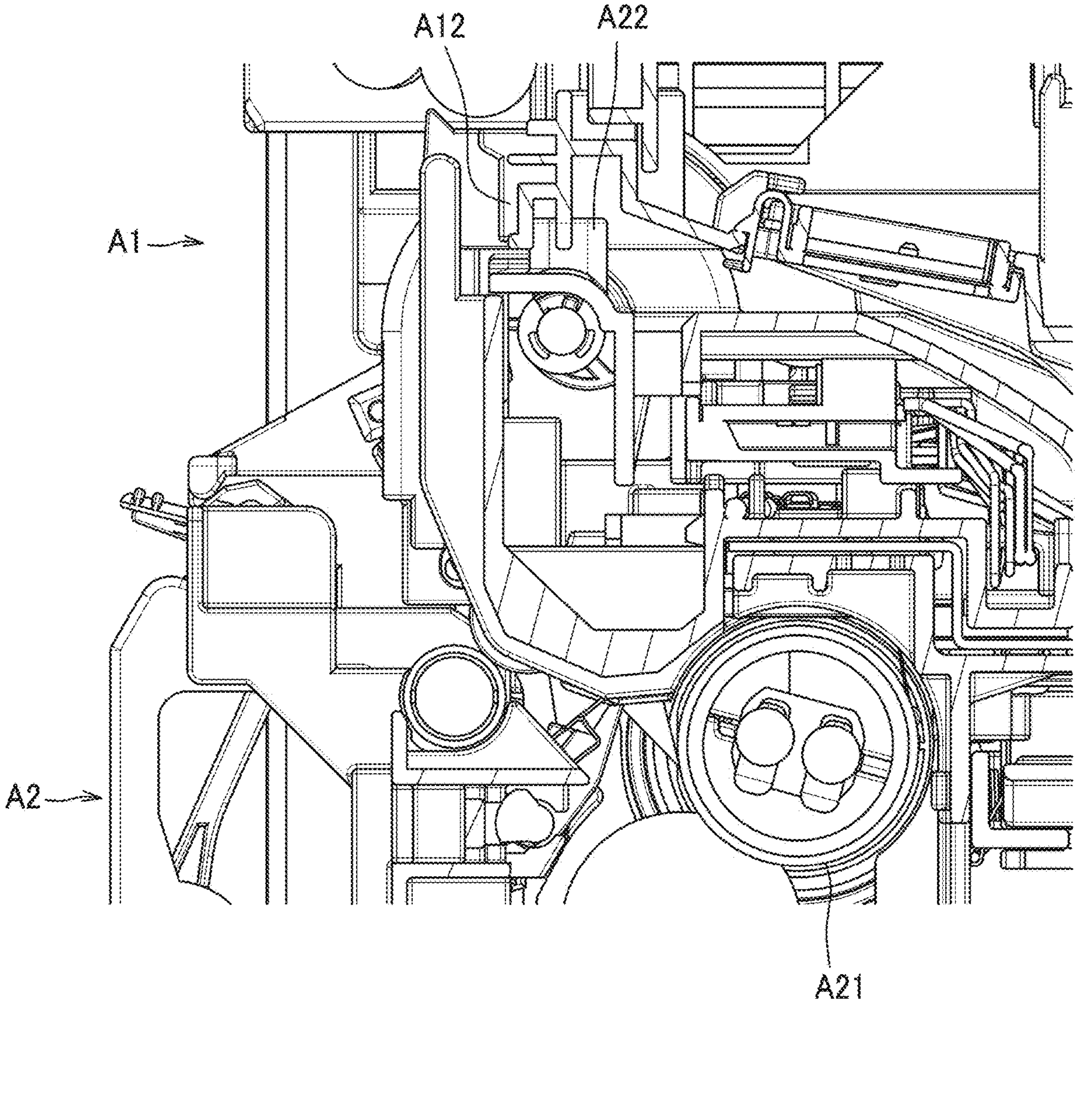
FIG. 11 is a cross-sectional view of a state where the first fixing unit is installed into the first main housing.

Each first unit contact portion A22 is positioned upstream of a downstream end of the first fixing unit A2 in a direction in which the fixing unit A2 is installed. Specifically, each first unit contact portion A22 is positioned on an upstream end portion of the first outer cover A4 in the direction in which the first fixing unit A2 is installed. As shown in FIG. 11, each first unit contact portion A22 is positioned upstream of the first heating roller A21 in the direction in which the first fixing unit A2 is installed.

As shown in FIG. 9B, each first unit contact portion A22 has a rectangular tube shape. Each first unit contact portion A22 has two flat surfaces perpendicular to the third direction and two flat surfaces perpendicular to the first direction. As described above, the first unit contact portions A22 are positioned in positions different from those of the first housing contact portions A12 in the first direction.

The first fixing unit A2 further comprises a unit sheet guide A5. The unit sheet guide A5 has a plurality of ribs A51 that guide the sheet S ejected from the first fixing unit A2. The sheet S ejected from the fixing unit A2 is guided by the plurality of ribs A51 and then is guided by the plurality of conveyance ribs A31 of the first main housing A1. Each first unit contact portion A22 is positioned downstream of the unit sheet guide A5 in the direction in which the first fixing unit A2 is installed.

Figure 10A:
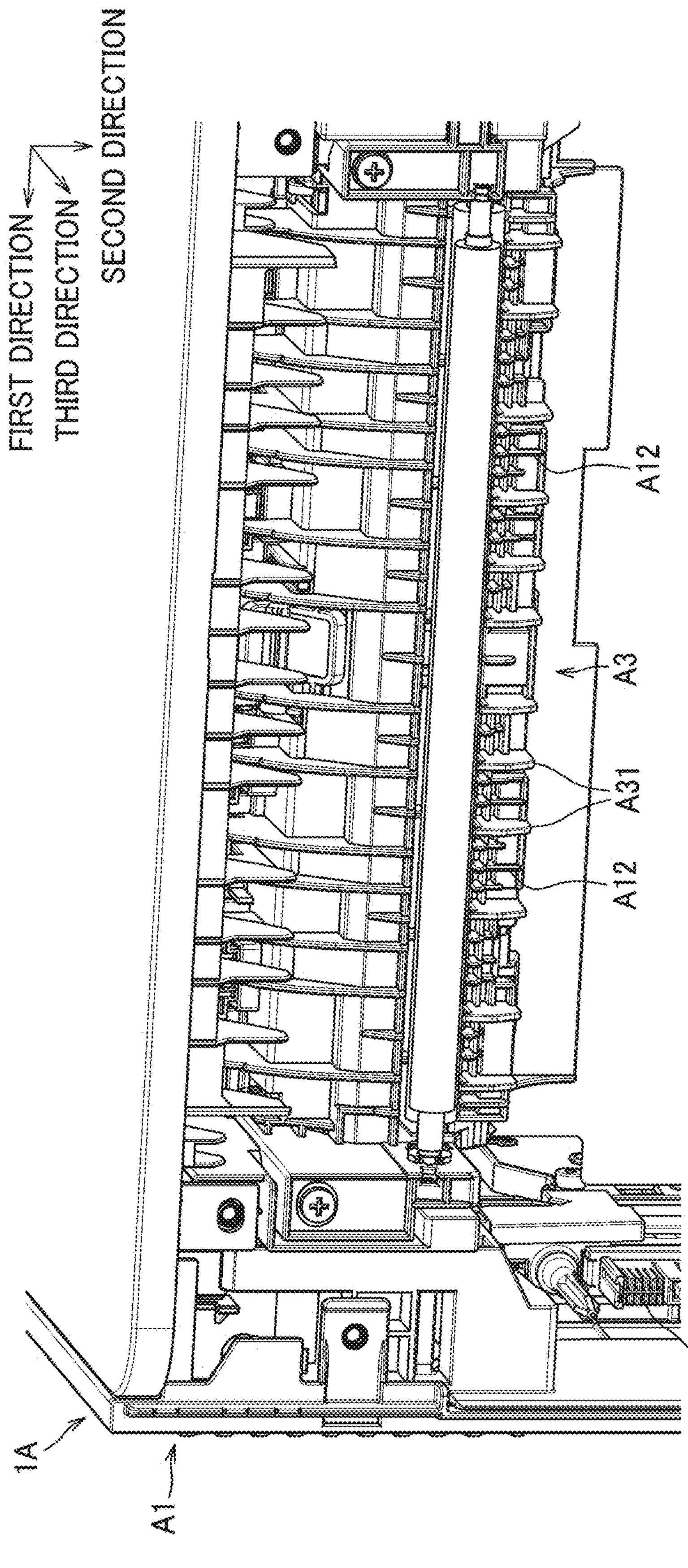
FIG. 10A is an illustration showing an example of a second housing contact portion.
Figure 10B:
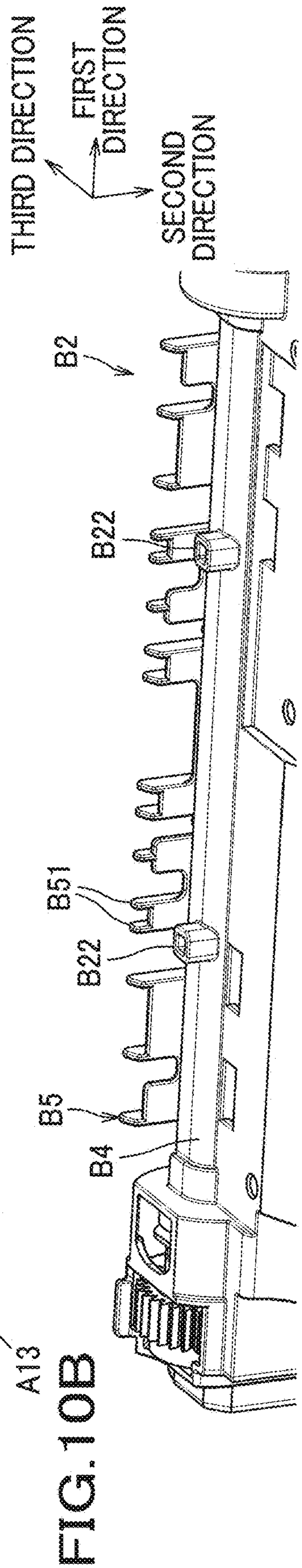
FIG. 10B is an illustration showing an example of a second unit contact portion.

As shown in FIG. 10B, the second fixing unit B2 comprises a second outer cover B4 forming an outer surface of the second fixing unit B2. The second outer cover B4 is made of plastic. Specifically, the first outer cover B4 forms a front surface and an upper surface of the second fixing unit B2. The second outer cover B4 has the two second unit contact portions B22.

Each second contact portion B22 is formed integrally with the second outer cover B4. Each second unit contact portion B22 is a protrusion protruding in a direction non-parallel to the first direction. Specifically, each second unit contact portion B22 protrudes upward from the upper surface of the second fixing unit B2.

Figure 12:
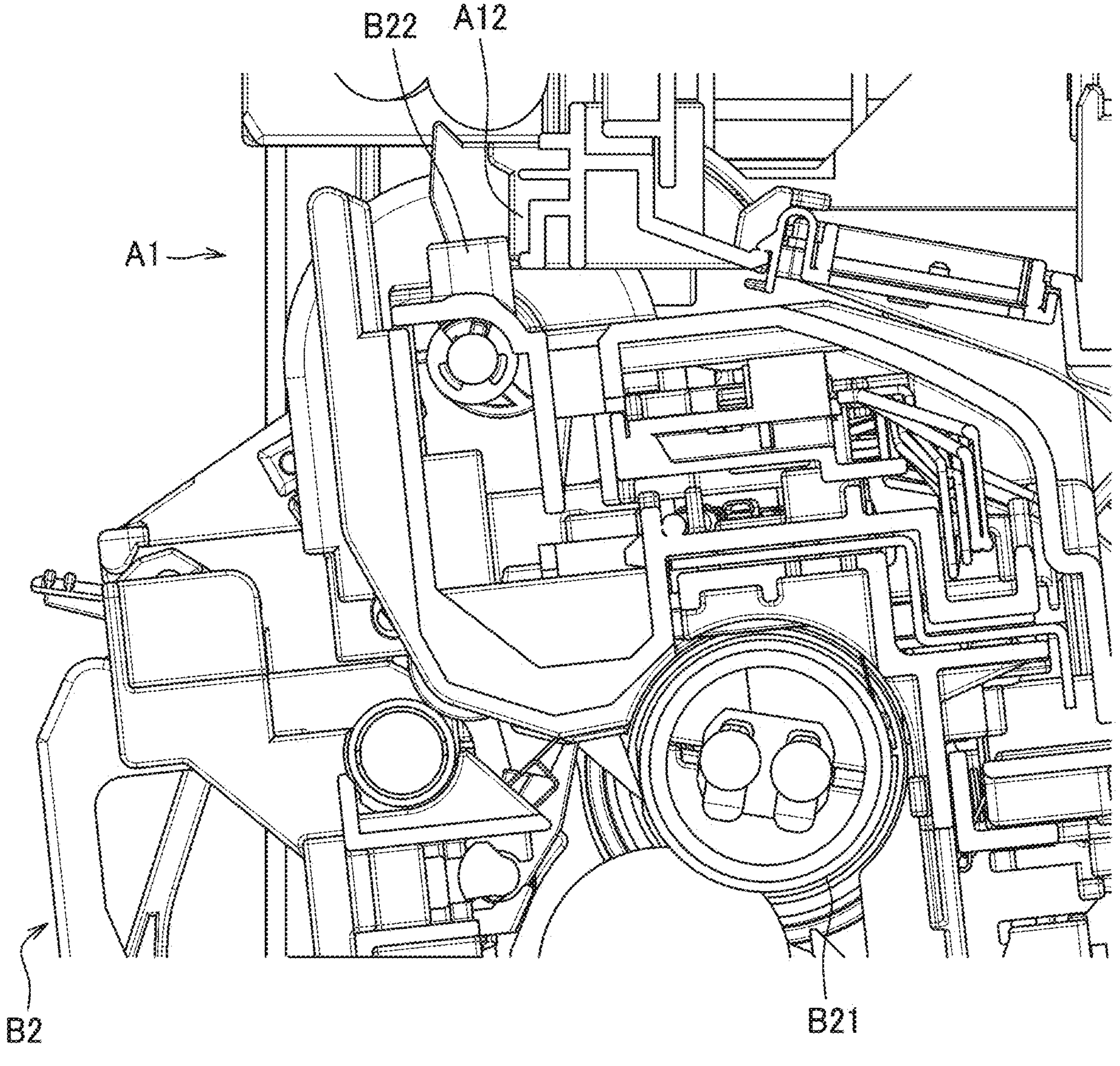
FIG. 12 is a cross-sectional view of a state where the second unit contact portion is in contact with the first main housing contact portion.

Each second unit contact portion B22 is positioned upstream of a downstream end of the second fixing unit B2 in a direction in which the fixing unit B2 is installed. Specifically, each second unit contact portion B22 is positioned on an upstream end portion of the second outer cover B4 in the direction in which the second fixing unit B2 is installed. As shown in FIG. 12, each second unit contact portion B22 is positioned upstream of the second heating roller B21 in the direction in which the second fixing unit B2 is installed.

As shown in FIG. 10B, the size and shape of the second unit contact portions B22 are the same as the first unit contact portions A22. As described above, the second unit contact portions B22 are positioned in the same positions as the corresponding first housing contact portions A12 in the first direction.

The second fixing unit B2 further comprises a unit sheet guide B5. The unit sheet guide B5 has a plurality of ribs B51 that guide the sheet S ejected from the second fixing unit B2. Each second unit contact portion B22 is positioned downstream of the unit sheet guide B5 in the direction in which the second fixing unit B2 is installed.

Though not shown in the drawings, the second main housing B1 comprises a second sheet guide as an example of a second member. The second sheet guide is a member elongated in the first direction, and has the two second housing contact portions B12 and a plurality of conveyance ribs.

Figure 13B:
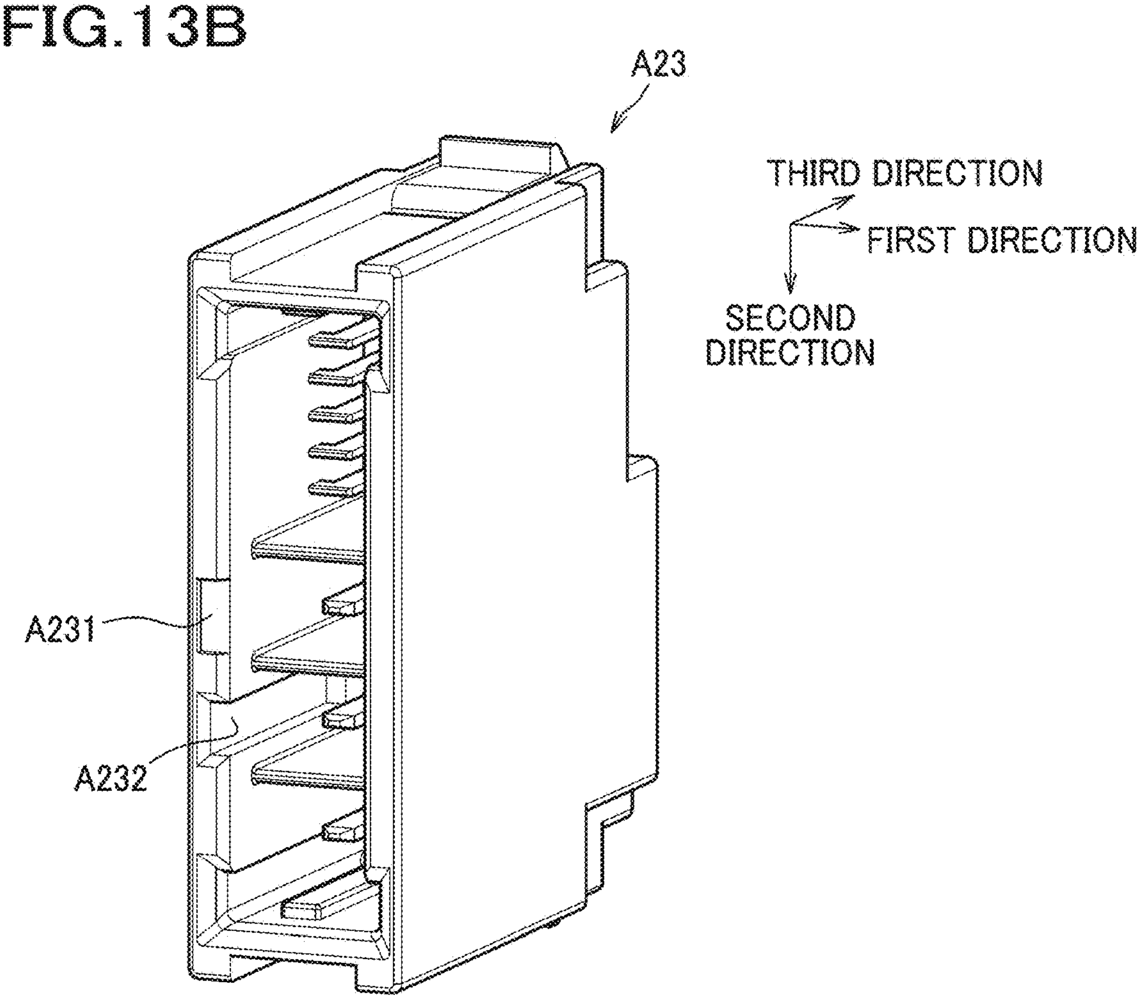
FIG. 13B is an enlarged view of a first unit connector.

As shown in FIG. 13A, the first fixing unit A2 comprises a first unit connector A23 having the same function as the unit connector 170 described above. As shown in FIG. 13B, the first unit connector A23 has a first unit interference portion A231 and a first groove A232.

The first unit interference portion A231 has a surface perpendicular to the third direction. The first groove A232 extends in the third direction. The position of the first unit interference portion A231 in the second direction and the position of the first groove A232 in the second direction are different.

Figure 14:
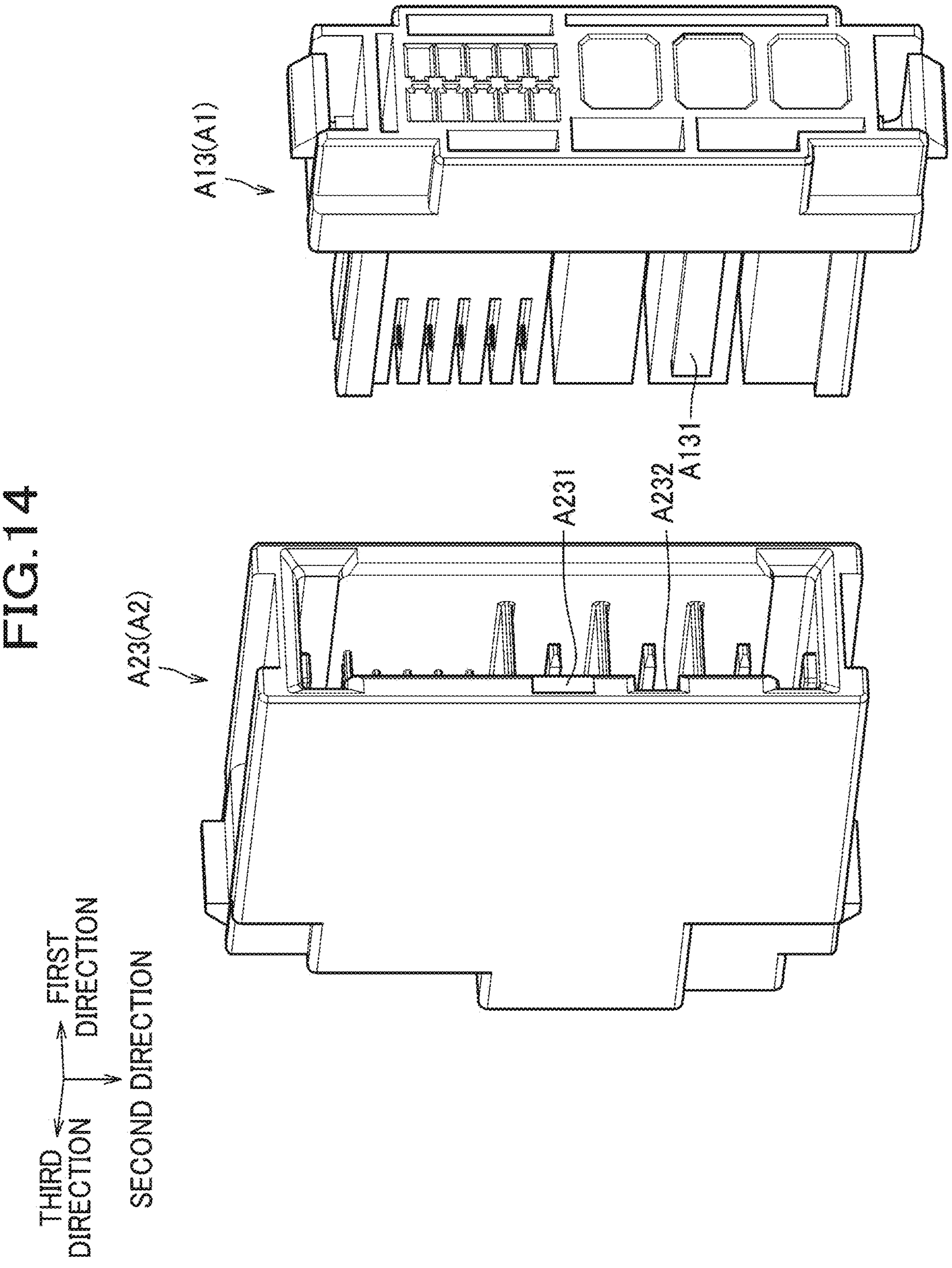
FIG. 14 is a perspective view showing the relationship between the first unit connector and a first housing connector.

As shown in FIG. 14, the first main housing A1 comprises a first housing connector A13 having the same function as the unit connector 160 described above. The first housing connector A13 has a first housing interference portion A131. The first housing interference portion A131 is a projection, and is positioned at a position corresponding to the first groove A232 in the second direction. Thus, when the first fixing unit A2 is inserted into the first main housing A1, the first housing interference portion A131 enters the first groove A232, which allows the first unit connector A23 to be connected to the first housing connector A13.

Figure 15:
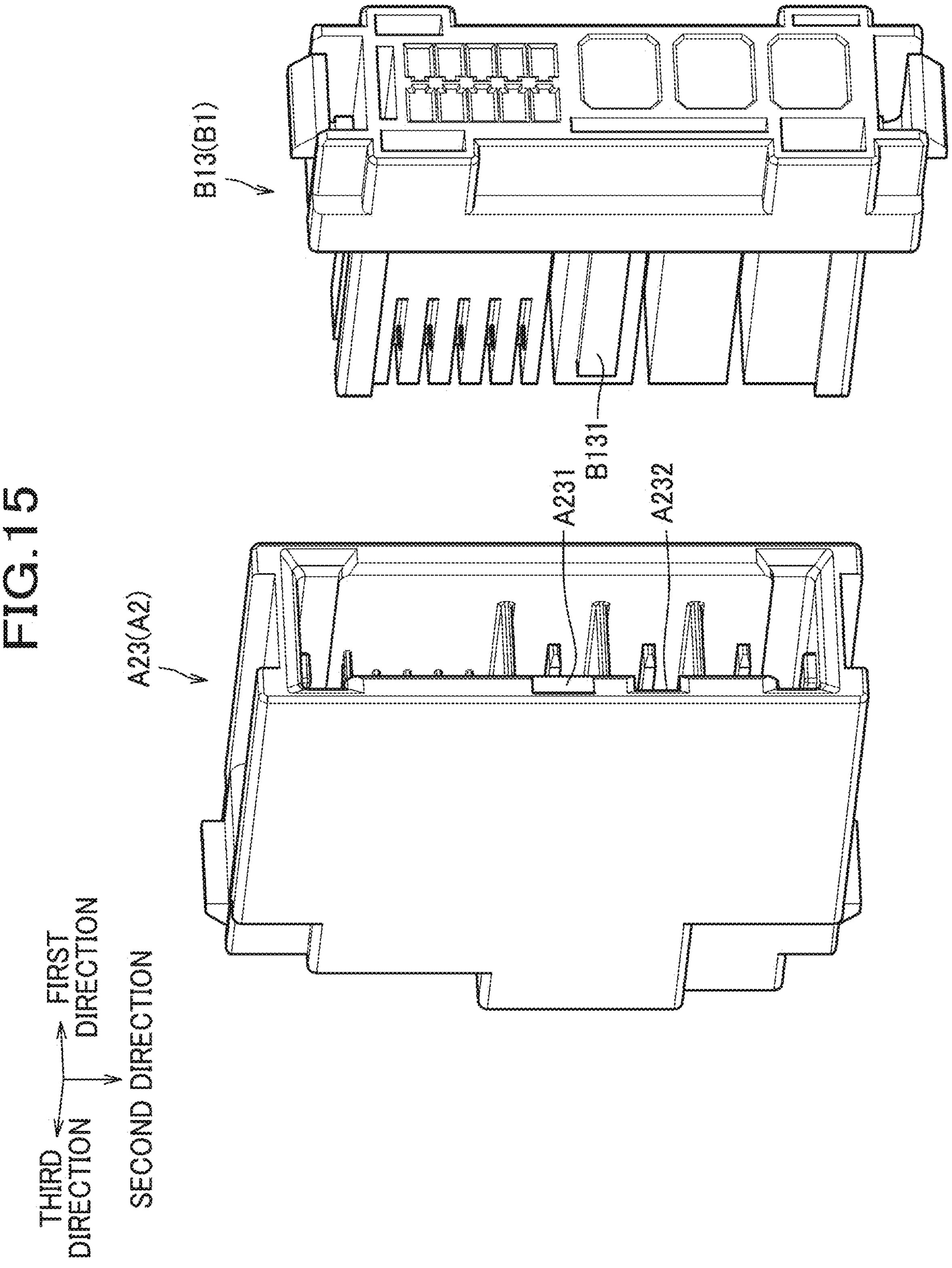
FIG. 15 is a perspective view showing the relationship between the first unit connector and a second housing connector.

As shown in FIG. 15, the second main housing B1 comprises a second housing connector B13 having the same function as the unit connector 160 described above. The second housing connector B13 has a second housing interference portion B131. The second housing interference portion B131 is a projection, and is positioned at a position corresponding to the first unit interference portion A231 in the second direction. Thus, in a situation where one attempts to install the first fixing unit A2 into the second main housing B1 by mistake, the first unit interference portion A231 contacts the second housing interference portion B131 in a process where the first fixing unit A2 is guided by the second guide B11, and the first unit connector A23 cannot be connected to the second housing connector B13.

Though not shown in the drawings, the second fixing unit B2 comprises a second unit connector connectable to the second housing connector B13. The second unit connector has a second unit interference portion and a second groove. The positional relationship between the second unit interference portion and the second groove is opposite to the positional relationship of the first unit interference portion A231 and the first groove A232. Thus, the second unit interference portion contacts the first housing interference portion A131 when the second fixing unit B2 is guided by the first guide A11, and the second connector cannot be connected to the first housing connector A13.

As shown in FIG. 11, in a situation where the first fixing unit A2 is installed in the first main housing A1, the first unit contact portion A22 does not contact the first housing contact portion A12, and the first fixing unit A2 moves to the installation position of the first main housing A1 and is installed in the main housing A1. As shown in FIGS. 6 and 7, the interlock switch 87 provided on the first main housing A1 (also referred to as "first interlock switch" in the following description) is switched from the off-state to the on-state by being pressed by the first fixing unit A2 in the process of the first fixing unit A2 being installed in the first main housing A1.

As shown in FIG. 12, in a situation where one attempts to install the second fixing unit B2 into the first main housing A1 by mistake, since the second unit contact portion B22 contacts the first housing contact portion A12, the second fixing unit B2 cannot be moved to the installation position, and as shown in FIG. 6A, the first reference portion 120 does not enter the first recess G3. Specifically, the movement of the second fixing unit B2 is stopped with the downstream end of the fixing unit B2 in the installation direction facing diagonally upward. In this state, it is visible to the user from above that the second unit contact portion B22 is stopped by the first housing contact portion A12, and the user can be aware that the second fixing unit B2 has a specification that cannot be installed in the first main housing A1.

Since the movement of the second fixing unit B2 is stopped with the fixing unit B2 tilted diagonally upward, the first interlock switch is not switched to the on-state. In other words, the first interlock switch remains in the off-state from the start of the insertion of the second fixing unit B2 into the first main housing A1 until the second unit contact portion B22 contacts the first housing contact portion A12 since the first interlock switch is not pressed by the second fixing unit B2.

Though not shown in the drawings, the second main housing B1 comprises the interlock switch 87 (also referred to as "second interlock switch" in the following description). The second interlock switch is switched from the off-state to the on-state by being pressed by the second fixing unit B2 in the process of the second fixing unit B2 being installed into the second main housing B1. The second interlock switch remains in the off-state from the start of the insertion of the first fixing unit A2 into the second main housing B1 until the first unit contact portion A22 contacts the second housing contact portion B12 since the second interlock switch is not pressed by the first fixing unit A2.

Furthermore, the first timing at which the second unit interference portion of the second unit connector reaches the first housing interference portion A131 of the first housing connector A13 may be the same timing as the second timing at which the second unit connector B22 reaches the first housing contact portion A12. In other words, the positional relationship of the second unit interference portion, the first housing interference portion A131, the second unit contact portion B22, and the first housing contact portion A12 may be adjusted such that the first timing and the second timing is the same.

The positional relationship of the second unit interference portion, the first housing interference portion A131, the second unit contact portion B22, and the first housing contact portion A12 may be adjusted such that the first timing comes after the second timing. In this configuration, for example, in a situation where the second unit contact portion B22 breaks and loses its function, the second unit interference portion contacts the first housing interference portion A131, and the fixing unit can be reliably restrained from being installed by mistake.

The positional relationship of the second unit interference portion, the first housing interference portion A131, the second unit contact portion B22, and the first housing contact portion A12 may be adjusted such that the first timing comes before the second timing. In this configuration, the second unit interference portion and the first housing interference portion A131 function as the second unit contact portion and the first housing contact portion that interferes with installation of the second fixing unit B2 into the first main housing A1. In this configuration, for example, in a situation where the second unit interference portion breaks and loses its function, the second unit contact portion B22 contacts the first housing contact portion A12, and the fixing unit can be reliably restrained from being installed by mistake.

Figure 16A:
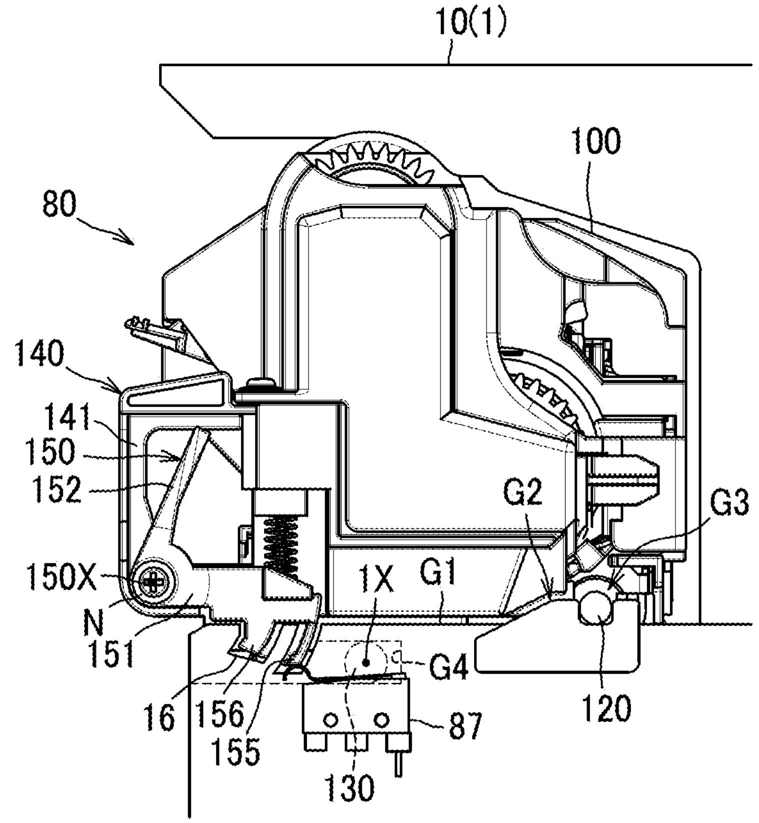
FIGS. 16A and 16B are illustrations showing an embodiment in which the interlock switch is switched from the off-state to the on-state in a state where the fixing unit is installed in the main housing.
Figure 16B:
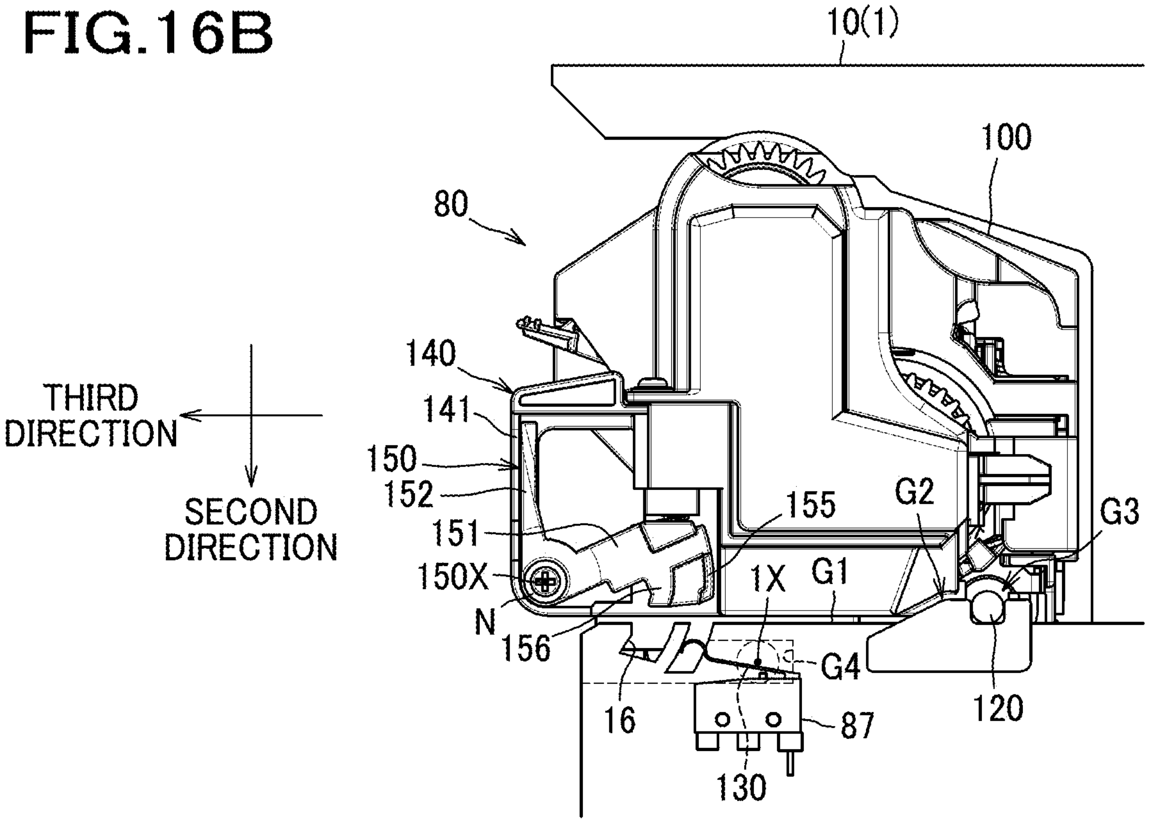

Although the interlock switch 87 is configured to be switched from the off-state to the on-state by being pressed by the fixing unit 80 in the process where the fixing unit 80 is installed into the main housing 10 in the above-described embodiment, the interlock switch 87 may be configured, for example, to be switched from the off-state to the on-state in a state where the fixing unit 80 is installed in the main housing 10, as shown in FIGS. 16A and 16B. Specifically, in the structure shown in FIGS. 16A and 16B, the lever 150 comprises a switch contact portion 155. The lever 150 is rotatable between a first lever position shown in FIG. 16A and a second lever position shown in FIG. 16B in the state where the fixing unit 80 is installed in the main housing 10. When the lever 150 moves from the second lever position to the first lever position in the state where the fixing unit 80 is installed in the main housing 10, the interlock switch 87 is switched from the off-state to the on-state by being pressed by the switch contact portion 155.

By the interlock switch 87 being configured to be switched from the off-state to the on-state in a state where the fixing unit 80 is installed in the main housing 10, the power supply to the fixing unit 80 is allowed only in a state where the fixing unit 80 is installed in the main housing 10. Thus, power supply to the fixing unit is allowed only when the first fixing unit is installed in the first main housing. Also, power supply to the fixing unit is allowed only when the second fixing unit is installed in the second main housing.

According to the above, the following advantageous effects can be obtained by the present embodiment.

If one attempts to install the second fixing unit B2 into the first main housing A1 by mistake, since the second unit contact portion B22 contacts the first housing contact portion A12 when the second fixing unit B2 is being guided by the first guide A11 and the second fixing unit B2 is stopped part way. Thus, incorrect installation can be determined without operating the first image forming apparatus 1A. Since predetermined portions of the second fixing unit B2 and the first main housing A1 contact each other, for example, a part of the second fixing unit having a low rigidity can be restrained from contacting the first main housing A1 and breaking. This advantageous effect can be obtained by any combination of the fixing units and the main housings with different specifications (for example, the first fixing unit A2 and the second main housing B1).

Since the second unit contact portion s B22 are positioned upstream of the downstream end of the second fixing unit B2 in the direction in which the fixing unit B2 is installed, the user can easily check the second unit contact portion B22 that is in contact with the first main housing A1 when the second unit contact portion B22 contacts the first housing contact portion A12. Thus, the user can immediately understand that the fixing unit is incorrectly installed. This advantageous effect can likewise be obtained by the other unit contact portion s.

Since the second fixing unit B2 comprises the two second unit contact portions B22 at positions corresponding to the two first housing contact portions A12, the second fixing unit B2 can be restrained from tilting about a vertical axis and becoming hard to remove. Particularly, since one second unit contact portion B22 is provided on one side of the central portion PC of the second fixing unit and the other second unit contact portion B22 is provided on the other side of the central portion PC in the present embodiment, the tilting of the second fixing unit B2 about the vertical axis can be further restrained. This advantageous effect can also be obtained when one attempts to install the first fixing unit A2 into the second main housing B1, when one attempts to install the third fixing unit C2 into the fourth main housing D1, and when one attempts to install the fourth fixing unit D2 into the third main housing C1.

Since the first unit connector A23 comprises a first unit interference portion A231 configured to contact the second housing interference portion B131 of the second housing connector B13, the first unit connector A23 can be restrained from being connected to the second housing connector B13 by mistake the first unit interference portion A231 contacting the second housing interference portion B131. Since the second unit connector comprises a second unit interference portion configured to contact the first housing interference portion A131 of the first housing connector A13, the second unit connector can be restrained from being connected to the first housing connector A13 by mistake in a similar manner.

Since the first interlock switch is kept in the off-state from when the second fixing unit B2 is inserted into the first main housing A1 until when the second unit contact portion B22 contacts the first housing contact portion A12, the first interlock switch can be restrained from being switched to the on-state and power can be restrained from being supplied from the first housing connector A13 to the second unit connector by mistake when the second fixing unit B2 is inserted into the first main housing A1. Similarly, since the second interlock switch is kept in the off-state from when the first fixing unit A2 is inserted into the second main housing B1 until when the first unit contact portion A22 contacts the second housing contact portion B12, power can be restrained from being supplied from the second housing connector B13 to the first unit connector A23 by mistake.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

There may be one or more than three of the first unit contact portions, the second unit contact portions, the third unit contact portions, and the fourth unit contact portions. There may be one or more than three of the first housing contact portions, the second housing contact portions, the third housing contact portions, and the fourth housing contact portions.

If there is a plurality of first unit contact portions, all of the first unit contact portions may be provided on one side of the central portion of the first fixing unit. The unit contact portions that have other specifications may also be provided in a similar manner.

If there is a plurality of first unit contact portions, at least one first unit contact portion may be provided on one side of the central portion of the first fixing unit and at least one first unit contact portion may be provided on the other side of the central portion of the first fixing unit. In this case, the number of the first unit contact portions provided on the one side of the central portion and the number of the first unit contact portion provided on the other side of the central portion may be the same or may be different. The unit contact portions that have other specifications may also be provided in a similar manner.

The first unit contact portion are not limited to a protrusion, and may be any shape as long as they have a surface that contacts the second housing contact portion. The unit contact portions that have other specifications may also have similar shapes.

The first housing contact portions are not limited to ribs, and may be any shape as long as they have a surface that contacts second unit contact portions. The housing contact portions that have other specifications may also have similar shapes.

The heating member is not limited to the heating roller, and may be, for example, a cylindrical fixing film slidably supported by guides.

The image forming apparatus is not limited to a laser printer and may be other image forming apparatuses such as a copying machine or a multifunctional device.

The elements described in the above example embodiment and its modified examples may be implemented selectively and in combination.

What is claimed is:

1. An image forming system comprising:

a first image forming apparatus comprising a first housing and a first fixing unit installable into and removable from the first housing; and a second image forming apparatus comprising a second housing and a second fixing unit installable into and removable from the second housing, wherein the first housing comprises:

a first guide configured to guide the first fixing unit in a predetermined direction and to guide the second fixing unit in the predetermined direction; and a first housing contact portion, the second housing comprises:

a second guide configured to guide the first fixing unit in the predetermined direction and to guide the second fixing unit in the predetermined direction; and a second housing contact portion, wherein the first fixing unit comprises a first unit contact portion that interferes with installation of the first fixing unit into the second housing, the first unit contact portion being configured to contact the second housing contact portion during the process in which the first fixing unit is guided by the second guide, the second fixing unit comprises a second unit contact portion that interferes with installation of the second fixing unit into the first housing, the second unit contact portion being configured to contact the first housing contact portion during the process in which the second fixing unit is guided by the first guide, and the first unit contact portion and the second unit contact portion are protrusions, each of the protrusions protruding in a direction non-parallel to the predetermined direction.

2. The image forming system according to claim 1, wherein the first unit contact portion is positioned upstream of a downstream end of the first fixing unit in a direction in which the first fixing unit is installed, and the second unit contact portion is positioned upstream of a downstream end of the second fixing unit in a direction in which the second fixing unit is installed.

3. The image forming system according to claim 1, wherein the first fixing unit further comprises a first heating member configured to heat a sheet, and the first unit contact portion is positioned within a range of the first heating member in a width direction of a sheet, and the second fixing unit further comprises a second heating member configured to heat a sheet, and the second unit contact portion is positioned within a range of the second heating member in a width direction of the sheet.

4. The image forming system according to claim 1, wherein the first fixing unit further comprises a first outer cover made of plastic, the first outer cover forming an outer surface of the first fixing unit, the second fixing unit further comprises a second outer cover made of plastic, the second outer cover forming an outer surface of the second fixing unit, the first unit contact portion is formed integrally with the first outer cover, and the second unit contact portion is formed integrally with the second outer cover.

5. The image forming system according to claim 1, wherein the first housing comprises a first housing connector, the second housing comprises a second housing connector, the first fixing unit comprises a first unit connector connectable to the first housing connector, the second fixing unit comprises a second unit connector connectable to the second housing connector, the first housing connector has a first housing interference portion, the second housing connector has a second housing interference portion, wherein the first unit connector comprises a first unit interference portion that interferes with connection of the first unit connector to the second housing connector, the first unit interference portion being configured to contact the second housing interference portion during the process in which the first fixing unit is guided by the second guide, and the second unit connector comprises a second unit interference portion that interferes with connection of the second unit connector to the first housing connector, the second unit interference portion being configured to contact the first housing interference portion during the process in which the second fixing unit is guided by the first guide.

6. The image forming system according to claim 5, wherein the first housing further comprises a first interlock switch configured to allow power to be supplied from the first housing connector to the first unit connector in an on-state and to shut off power from the first housing connector to the first unit connector in an off-state, the second housing further comprises a second interlock switch configured to allow power to be supplied from the second housing connector to the second unit connector in an on-state and to shut off power from the second housing connector to the second unit connector in an off-state, the first interlock switch is switched from the off-state to the on-state in a state where the first fixing unit is installed in the first housing, and the second interlock switch is switched from the off-state to the on-state in a state where the second fixing unit is installed in the second housing.

7. The image forming system according to claim 5, wherein the first housing further comprises a first interlock switch configured to allow power to be supplied from the first housing connector to the first unit connector in an on-state and to shut off power from the first housing connector to the first unit connector in an off-state, the second housing further comprises a second interlock switch configured to allow power to be supplied from the second housing connector to the second unit connector in an on-state and to shut off power from the second housing connector to the second unit connector in an off-state, the first interlock switch is switched from the off-state to the on-state in a process where the first fixing unit is installed into the first housing by the first interlock switch being pressed by the first fixing unit, the first interlock switch remains in the off-state from when the second fixing unit is inserted into the first housing until when the second unit contact portion contacts the first housing contact portion by the first interlock switch not being pressed by the second fixing unit, the second interlock switch is switched from the off-state to the on-state in a process where the second fixing unit is installed into the second housing by the second interlock switch being pressed by the second fixing unit, the second interlock switch remains in the off-state from when the first fixing unit is inserted into the second housing until when the first unit contact portion contacts the second housing contact portion by the second interlock switch not being pressed by the first fixing unit.

8. An image forming system comprising:

a first image forming apparatus comprising a first housing and a first fixing unit installable into and removable from the first housing; and a second image forming apparatus comprising a second housing and a second fixing unit installable into and removable from the second housing, wherein the first housing comprises:

a first guide configured to guide the first fixing unit in a predetermined direction and to guide the second fixing unit in the predetermined direction; and a first housing contact portion, the second housing comprises:

a second guide configured to guide the first fixing unit in the predetermined direction and to guide the second fixing unit in the predetermined direction; and a second housing contact portion, wherein the first fixing unit comprises a first unit contact portion that interferes with installation of the first fixing unit into the second housing, the first unit contact portion being configured to contact the second housing contact portion during the process in which the first fixing unit is guided by the second guide, the second fixing unit comprises a second unit contact portion that interferes with installation of the second fixing unit into the first housing, the second unit contact portion being configured to contact the first housing contact portion during the process in which the second fixing unit is guided by the first guide, the first unit contact portion is positioned at a position different from a position of the first housing contact portion in a longitudinal direction of the first fixing unit in a state where the first fixing unit is installed in the first housing, and the second unit contact portion is positioned at a position different from a position of the second housing contact portion in a longitudinal direction of the second fixing unit in a state where the second fixing unit is installed in the second housing.

9. An image forming system comprising:

a first image forming apparatus comprising a first housing and a first fixing unit installable into and removable from the first housing; and a second image forming apparatus comprising a second housing and a second fixing unit installable into and removable from the second housing, wherein the first housing comprises:

a first guide configured to guide the first fixing unit in a predetermined direction and to guide the second fixing unit in the predetermined direction; and a first housing contact portion, the second housing comprises:

a second guide configured to guide the first fixing unit in the predetermined direction and to guide the second fixing unit in the predetermined direction; and a second housing contact portion, wherein the first fixing unit comprises a first unit contact portion that interferes with installation of the first fixing unit into the second housing, the first unit contact portion being configured to contact the second housing contact portion during the process in which the first fixing unit is guided by the second guide, the second fixing unit comprises a second unit contact portion that interferes with installation of the second fixing unit into the first housing, the second unit contact portion being configured to contact the first housing contact portion during the process in which the second fixing unit is guided by the first guide, a plurality of the first housing contact portions is provided on a first member elongated in a longitudinal direction of the first fixing unit, a plurality of the second housing contact portions is provided on a second member elongated in a longitudinal direction of the second fixing unit, the first fixing unit comprises a plurality of the first unit contact portions, each of the first unit contact portions being positioned at a position corresponding to each of the second housing contact portions, and the second fixing unit comprises a plurality of the second unit contact portions, each of the second unit contact portions being positioned at a position corresponding to each of the first housing contact portions.

10. The image forming system according to claim 9, wherein at least one first unit contact portion is provided on one side of a central portion of the first fixing unit in the longitudinal direction and at least one first unit contact portion is provided on another side of the central portion of the first fixing unit in the longitudinal direction, and at least one second unit contact portion is provided on one side of a central portion of the second fixing unit in the longitudinal direction and at least one second unit contact portion is provided on another side of the central portion of the second fixing unit in the longitudinal direction.

11. The image forming system according to claim 9, wherein each of the first member and the second member has a conveyance rib configured to guide the sheet.

* * * * *